United States Patent
Sudo

(10) Patent No.: US 9,001,915 B2
(45) Date of Patent: Apr. 7, 2015

(54) COMMUNICATION APPARATUS, COMMUNICATION METHOD, AND TRANSMITTING DEVICE

(75) Inventor: Hiroaki Sudo, Kanagawa (JP)

(73) Assignee: Godo Kaisha IP Bridge 1, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/271,914

(22) Filed: Oct. 12, 2011

(65) Prior Publication Data

US 2012/0087397 A1  Apr. 12, 2012

Related U.S. Application Data

(63) Continuation of application No. 11/814,910, filed as application No. PCT/JP2006/301156 on Jan. 25, 2006, now Pat. No. 8,064,538.

(30) Foreign Application Priority Data

Jan. 28, 2005  (JP) ................ 2005-021681

(51) Int. Cl.
*H04B 7/02* (2006.01)
*H04L 1/02* (2006.01)
(Continued)

(52) U.S. Cl.
CPC ............ *H04L 1/0026* (2013.01); *H04B 7/0632* (2013.01); *H04B 7/0658* (2013.01);
(Continued)

(58) Field of Classification Search
USPC ........................................................ 375/267
See application file for complete search history.

(56) References Cited

U.S. PATENT DOCUMENTS

2003/0022629 A1  1/2003  Miyoshi
2003/0083069 A1  5/2003  Vadgama
(Continued)

FOREIGN PATENT DOCUMENTS

EP  1 204 292  5/2002
JP  2002/064424  2/2002
(Continued)

OTHER PUBLICATIONS

H. Le, et al., "MIMO-OFDM Eigenmode Adaptive Transmission System: System Performance of Hierarchical Subgroup Power and Modulation Coding Adaptation," Technical Report of IEICE, Oct. 21, 2004, vol. 104, No. 395, pp. 99-104, RCS2004-170.
(Continued)

*Primary Examiner* — Tanmay Shah
(74) *Attorney, Agent, or Firm* — Dickinson Wright PLLC

(57) ABSTRACT

In MIMO communication, a communication device is provided that transmits a transfer rate request signal while reducing it and reducing the interference and power consumption when the transfer rate request signal is transmitted substantially without lowering the transmission efficiency. A modulation encoding unit encodes and modulates transmission data transmitted to a communication partner and the transfer rate request signal in the plurality of transmission antennas. A transmission unit and a transmission antenna transmit a signal from the modulation encoding unit. A transmission control unit controls transmission of a signal transmitted from the transmission antenna and transmits a transfer rate request signal of one transmission antenna via the transmission antenna according to a comparison result between a difference of the transfer rate request signal in the respective transmission antenna of the communication partner and a predetermined value.

12 Claims, 9 Drawing Sheets

(51) Int. Cl.
*H04L 1/00* (2006.01)
*H04B 7/06* (2006.01)
*H04L 1/06* (2006.01)
*H04L 1/18* (2006.01)

(52) U.S. Cl.
CPC ............ *H04B 7/0689* (2013.01); *H04L 1/0029* (2013.01); *H04B 7/0697* (2013.01); *H04L 1/0015* (2013.01); *H04L 1/06* (2013.01); *H04L 1/1829* (2013.01)

(56) References Cited

U.S. PATENT DOCUMENTS

| | | | |
|---|---|---|---|
| 2003/0128658 A1* | 7/2003 | Walton et al. | 370/208 |
| 2004/0022213 A1* | 2/2004 | Choi et al. | 370/332 |
| 2004/0196919 A1 | 10/2004 | Mehta | |
| 2004/0259508 A1 | 12/2004 | Murakami | |
| 2005/0170782 A1* | 8/2005 | Rong et al. | 455/67.11 |
| 2005/0250544 A1 | 11/2005 | Grant | |
| 2006/0023745 A1* | 2/2006 | Koo et al. | 370/468 |
| 2006/0072510 A1* | 4/2006 | Aizawa | 370/333 |
| 2006/0083191 A1 | 4/2006 | Niwano | |
| 2006/0099985 A1* | 5/2006 | Whinnett et al. | 455/522 |
| 2006/0285558 A1* | 12/2006 | Dottling et al. | 370/506 |

FOREIGN PATENT DOCUMENTS

| | | |
|---|---|---|
| JP | 2003/169036 | 6/2003 |
| JP | 2003/338802 | 11/2003 |
| JP | 2004/056569 | 2/2004 |
| JP | 2004/194262 | 7/2004 |

OTHER PUBLICATIONS

H. Le, et al., "MIMO-OFDM Eignemode Adaptive Transmission System: System Performance of Hierarchical Subgroup Power and Modulation Coding Adaptation," Technical Report of IEICE, Oct. 21, 2004, vol. 104, No. 395, pp. 99-104, RCS2004-170.
PCT International Search Report dated May 2, 2006.
3GPP TSG-RAN WG1 #42bis, R1-051267, Oct. 10-14, 2005, "Qualitative Evaluation of MIMO schemes for OFDM-based E-UTRA Downlink," pp. 1-5.
3GPP TR 25.876 v1.7.0 (Aug. 2004), 3rd Generation Partnership Project; Technical Specification Report Group Radio Access Network; "Multiple-Input Multiple Output in UTRA," pp. 1-53.
Supplementary European Search Report dated May 18, 2012.
3GPP TR 25.876 V1.7.0, "3rd Generation Partnership Project; Technical Specification Group Radio Access Network; Multiple-Input Multiple Output in UTRA," XP50380315A, Aug. 2004, pp. 1-52.
S. Grant, et al., "Per-Antenna-Rate-Control (PARC) in Frequency Selective Fading with SIC-GRAKE Receiver," IEEE 60th Vehicular Technology Conference, vol. 2, XP010786866, Sep. 26, 2004, pp. 1458-1462.

* cited by examiner $$\begin{pmatrix} RX1 \\ RX2 \end{pmatrix} = \begin{pmatrix} A & B \\ C & D \end{pmatrix} \begin{pmatrix} TX1 \\ TX2 \end{pmatrix} \quad \cdots\cdot(\text{EQUATION 1})$$

$$\begin{pmatrix} TX1 \\ TX2 \end{pmatrix} = \frac{1}{AD-BC} \begin{pmatrix} D & -B \\ -C & A \end{pmatrix} \begin{pmatrix} RX1 \\ RX2 \end{pmatrix} \quad \cdots\cdot(\text{EQUATION 2})$$

COMMUNICATION APPARATUS, COMMUNICATION METHOD, AND TRANSMITTING DEVICE

This is a continuation application of application Ser. No. 11/814,910 filed Jul. 26, 2007, which is a national stage of PCT/JP2006/301156 filed Jan. 25, 2006, which is based on Japanese Application No. 2005-021681 filed Jan. 28, 2005, the entire contents of each which are incorporated by reference herein.

TECHNICAL FIELD

The present invention relates to a transmitting apparatus and transmitting method of a MIMO (Multi-Input Multi-Output) communication scheme that transmits different signals from a plurality of antennas.

BACKGROUND ART

In recent years, MIMO (Multi-Input/Multi-Output) communication attracts attention as a technique that enables communication of large amount of data such as image. In MIMO communication, different transmission data (substreams) is respectively transmitted from a plurality of antennas of a transmitting side, and, on the receiving side, a plurality of transmission data mixed together on a channel is demultiplexed to the original transmission data using a channel estimation value.

In actuality, in MIMO communication, signals transmitted from a transmitting apparatus are received at the number of antennas larger than or equal to the number of transmitting apparatuses, and the channel characteristics between the antennas are estimated based on pilot signals inserted in the signals received at the antennas.

The estimated channel characteristics H is expressed by the matrix 2×2 when there are two transmitting antennas and two receiving antennas, for example. In MIMO communication, based on the inverse matrix of the obtained channel characteristics H and the received signals obtained at receiving antennas, the transmission signals (substream) transmitted from transmitting antennas are obtained.

The principle of MIMO communication, when the number of antennas of transmitter 10 and receiver 20 is two, respectively, will be described using FIG. 1A. Here, the signals transmitted from antennas 11 and 12 of transmitter 10 are TX1 and TX2, respectively, and the signals received by antennas 21 and 22 of receiver 20 are RX1 and RX2, respectively. At this time, the received signals (RX1 and RX2) can be expressed by equation 1 shown in FIG. 1B.

Here, in equation 1, A indicates the channel characteristics between transmitting antenna 11 and receiving antenna 21, B indicates the channel characteristics between transmitting antenna 12 and receiving antenna 21, C indicates the channel characteristics between transmitting antenna 11 and receiving antenna 22 and D indicates the channel characteristics between transmitting antenna 12 and receiving antenna 22.

At this time, when only signal TX1 is transmitted to receiver 20, for example, TX2 becomes an interference signal for receiver 20, and the signal received by antenna 21 includes both the desired signal component and interference signal component. The same holds true for antenna 22.

In order to remove (compensate) the above interference signal component from the received signals and obtain the transmission signals (TX1 and TX2), it is necessary to obtain the inverse matrix of the matrix formed with four channel characteristics A, B, C and D, as shown in equation 2. Therefore, transmitter 10 transmits a signal where a known signal (for example, a pilot signal) for channel estimation is inserted in the transmission signal, and receiver 20 performs channel estimation based on this known signal, obtains channel characteristics A, B, C and D, and obtains the above inverse matrix.

In actuality, the steps for obtaining the transmission signals (TX1 and TX2) from the received signals (RX1 and RX2) include operations such as a ZF (Zero-Forcing) operation that demultiplexes substreams (each data) only through the inverse matrix operation expressed by equation 2 or an MMSE (Minimum Mean Square Error) operation that performs demultiplexing so as to minimize an error.

Thus, in MIMO communication, theoretically, a plurality of signals transmitted at the same frequency and at the same time can be respectively demultiplexed at the receiver, thereby enabling high-speed and high-capacity communication.

By the way, in a MIMO communication scheme, a plurality of transmission systems that use radio sections provided with power amplifiers having large power consumption are required on the transmitting side. It is well known that, when a MIMO communication scheme is applied to uplink, the power consumption of receiver 20 will become extremely large. Further, downlink is considered important with respect to the throughput of a MIMO communication scheme. For these reasons, a MIMO communication scheme is generally used only in downlink.

In such a MIMO communication scheme, as disclosed in Non-Patent Document 1, to further improve the throughput, a method is studied of independently setting a transmission rate per antenna and transmitting a CQI (Channel Quality Indicator), which is a transmission rate setting signal of each antenna.

A CQI is a signal that indicates the modulation scheme and coding rate of packet data that can be demodulated in receiver 20. Transmitter 10, such as a base station, for example, has the CQI transmitted from receiver 20 at a period set by an upper apparatus such as an RNC (Radio Network Controller). Transmitter 10 receiving the CQI performs scheduling using the CQI transmitted from receiver 20 and independently selects per antenna the optimum modulation scheme and coding rate. Then, transmitter 10 modulates and encodes the transmission data using the selected modulation scheme and coding rate, and transmits the data to receiver 20 based on the scheduling result. By this means, by adaptively changing the transmission rate according to the radio wave propagation environment, it is possible to transmit large amount of data from transmitter 10 to receiver 20.

Non-Patent Document 1: 3GPP TR25.876

DISCLOSURE OF THE INVENTION

Problems to be Solved by the Invention

However, in a conventional MIMO communication scheme that independently sets a transmission rate per antenna, the transmitter (transmitting apparatus) transmits to a communicating party the transmission rate request signals (CQI) corresponding to the number of antennas, and therefore the amount of transmission rate request signals transmitted from the receiver side to the transmitting side becomes equivalent times of the number of antennas. Thus, when the transmission rate request signals are transmitted from the receiving side, there are problems that interference to other receivers (users) increases and receiver power consumption increases.

It is therefore an object of the present invention to provide a communication apparatus and a communication method capable of reducing the transmission rate request signals and performing transmission without substantially reducing transmission efficiency, and reduce interference and power consumption upon transmission of transmission rate request signals.

Means for Solving the Problem

The communication apparatus of the present invention that transmits transmission data and transmission rate request signals corresponding to a plurality of transmitting antennas to a communicating party of a MIMO communication scheme that transmits different data from the plurality of transmitting antennas by independently setting a transmission rate per transmitting antenna, employs a configuration including: a transmitting section that transmits the transmission data and the transmission rate request signals; and a controlling section that controls transmission of signals to be transmitted from the transmitting section, wherein the controlling section transmits, through the transmitting section, the transmission rate request signals corresponding to less transmitting antennas than the plurality of transmitting antennas, based on a comparison result between a difference between the transmission rate request signals of the transmitting antennas of the communicating party and a predetermined value.

Advantageous Effect of the Invention

As described above, according to the present invention, in a MIMO communication scheme, it is possible to reduce the transmission rate request signals and perform transmission without substantially decreasing transmission efficiency, and reduce interference and power consumption upon transmission of transmission rate request signals.

BEST MODE FOR CARRYING OUT THE INVENTION

Now embodiments of the present invention will be described in detail with reference to the drawings.

Embodiment 1

Figure 2:
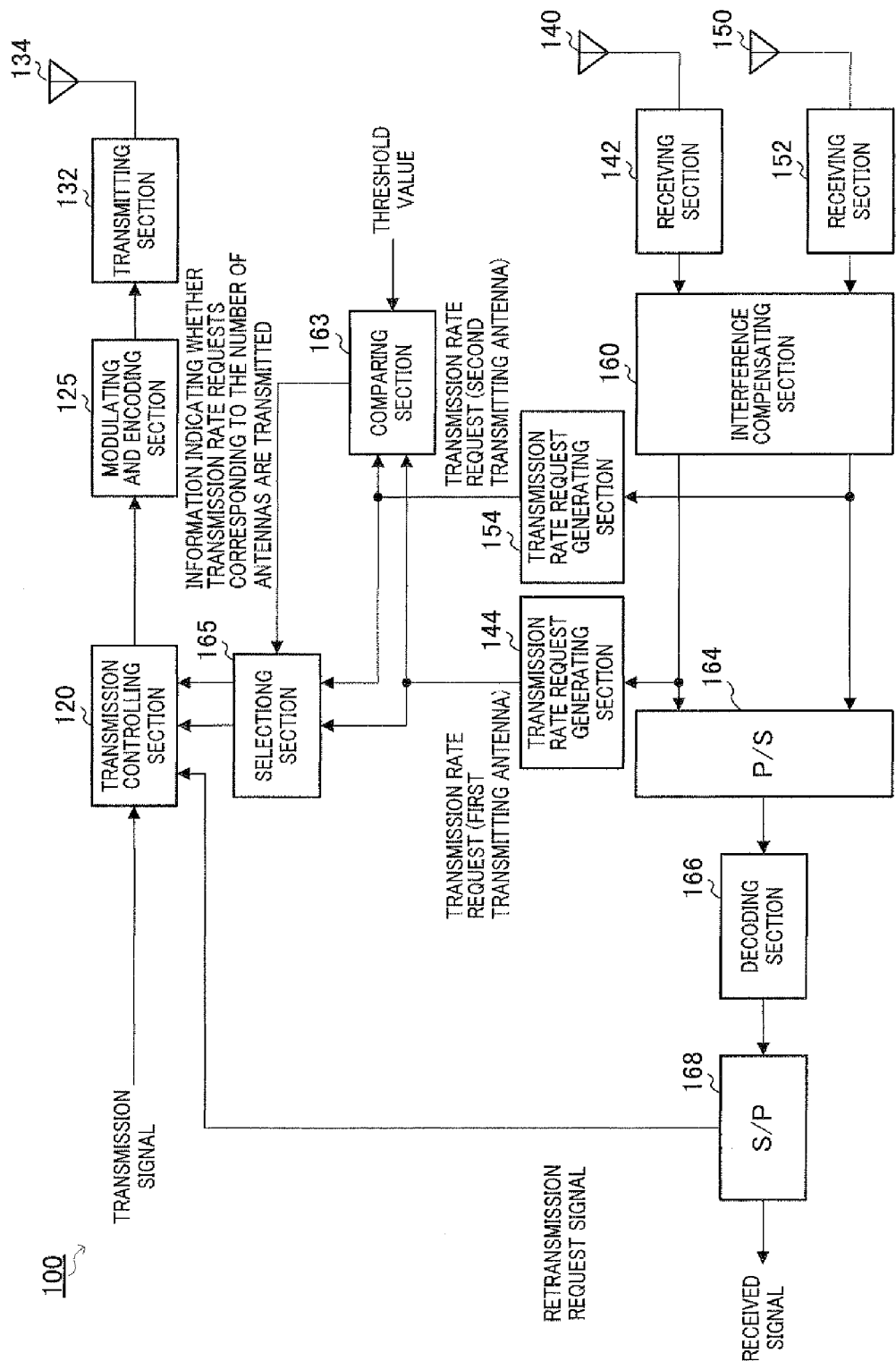
FIG. 2 is a block diagram showing a configuration of a terminal apparatus, which is a communication apparatus, according to Embodiment 1 of the present invention.

FIG. 2 is a block diagram showing the configuration of terminal apparatus 100, which is a communication apparatus, according to Embodiment 1 of the present invention.

In a MIMO communication scheme, when the difference between the transmission rate request signals of the transmitting antennas of a communicating party is smaller than a predetermined value, by transmitting only the transmission rate request signal corresponding to one antenna, terminal apparatus 100 of Embodiment 1 can reduce transmission rate request signals without substantially decreasing transmission efficiency and reduce interference and power consumption upon transmission of transmission rate request signals. Terminal apparatus 100 of the present embodiment using a CDMA (Code Division Multiple Access) communication scheme will be described.

Terminal apparatus (communication apparatus) 100 shown in FIG. 2 has transmission controlling section 120 that controls transmission of transmission data, modulating and encoding section 125 that modulates and encodes the data to be transmitted, transmitting section 132 that converts the frequency to a radio frequency band, and transmitting antenna 134. Furthermore, terminal apparatus 100 has receiving antennas 140 and 150, receiving sections 142 and 152, interference compensating section 160, transmission rate request generating sections 144 and 154, comparing section 163, P/S (parallel-to-serial) converting section (indicated by "P/S" in FIG. 2) 164, selecting section 165, decoding section 166 and S/P (serial-to-parallel) converting section (indicated by "S/P" in FIG. 2) 168.

Transmission controlling section 120 controls transmission of the transmission signal transmitted to transmitting apparatus (base station) 200, stores and outputs the transmission signal to modulating and encoding section 125 at the transmission time.

Further, transmission controlling section 120 controls transmission based on the transmission rate request signals of transmitting antennas 210 and 220 of each communicating party inputted from transmission rate request generating sections 144 and 154, and the retransmission request signal from S/P converting section 168.

Furthermore, transmission controlling section 120 controls transmission of the transmission rate request signals based on the selection result inputted from selecting section 165. To be more specific, transmission controlling section 120 controls transmission of the transmission rate request signals corresponding to the number of all antennas or the transmission rate request signal corresponding to one transmitting antenna of the communicating party selected by selecting section 165.

Modulating and encoding section 125 modulates and encodes the transmission data and outputs the result to transmitting section 132. The modulated and encoded transmission signal is converted to a radio frequency band by transmitting section 132 and transmitted through transmitting antenna 134.

Receiving antennas 140 and 150 receive the data transmitted from a communicating party (here, transmitting apparatus 200 shown in FIG. 3), and respectively output the data to corresponding receiving sections 142 and 152.

Receiving sections 142 and 152 convert the frequency of the received signals, which are radio frequency band signals received at receiving antennas 140 and 150, obtain baseband signals and output the signals to interference compensating section 160.

Interference compensating section 160 performs interference compensation processing on the received signals converted to baseband signals, obtains the data transmitted from transmitting antennas of the communicating party, and outputs the obtained transmission data to transmission rate request generating sections 144 and 154 and P/S converting section 164.

Figure 3:
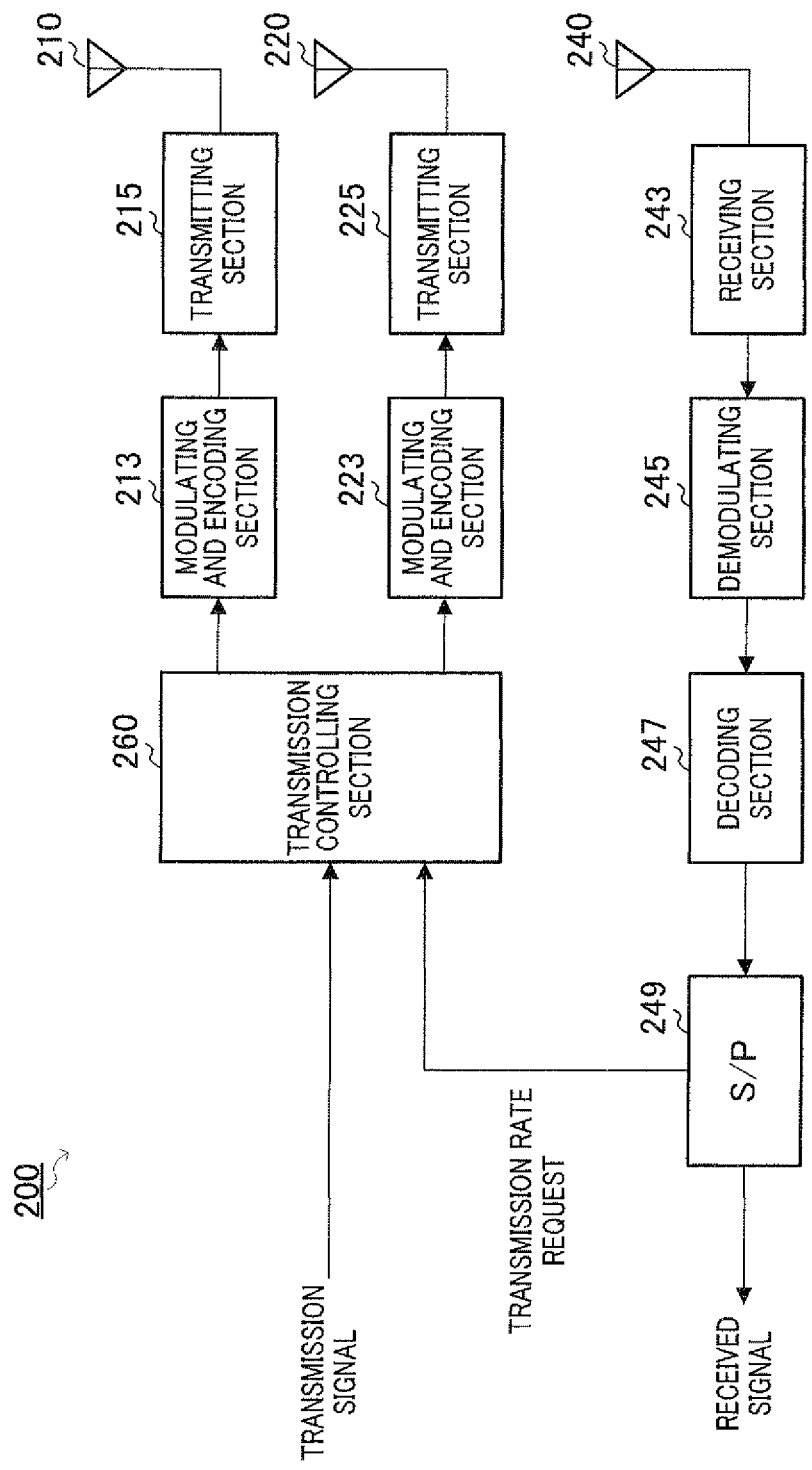
FIG. 3 is a block diagram showing a schematic configuration of a transmitting apparatus, which is one example of a communicating party of the terminal apparatus, shown in FIG. 2.

Transmission rate request generating sections 144 and 154 perform channel quality estimation per antenna (for example, first and second transmitting antennas 210 and 220 shown in FIG. 3) of the communicating party, and generate a transmission rate request signal (CQI: Channel Quality Indicator) of each antenna.

Transmission rate request generating sections 144 and 154 respectively correspond to the transmitting antennas (for example, first and second transmitting antennas 210 and 220 shown in FIG. 3) of the communicating party, and outputs the quality estimation result including transmission rate request signals of antennas.

Figures 1A, 1B:
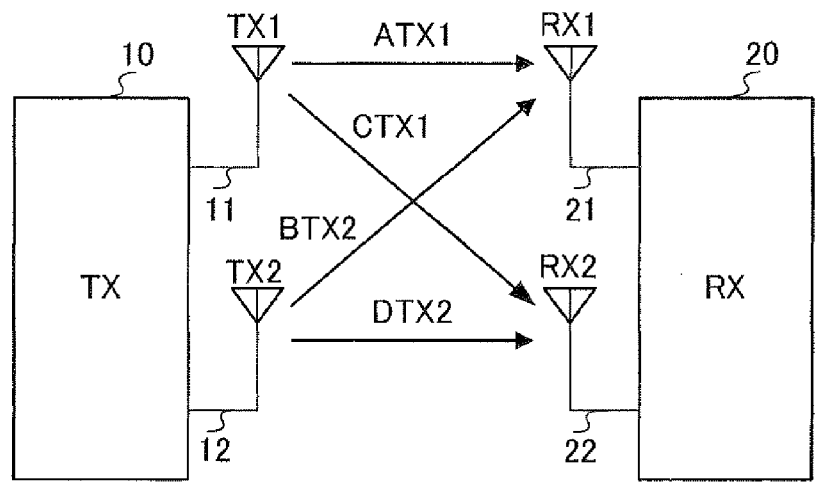
FIG. 1A illustrates the principle of MIMO communication when the number of antennas of a transmitter and receiver is two, respectively.
FIG. 1B is an equation expressing the relationship between the transmission signals and received signals of FIG. 1A.

As in the present embodiment, with the channel quality estimation method performed by transmission rate request generating sections 144 and 154, calculation can be performed based on four channel estimation results, when there are two receiving antennas of terminal apparatus 100 and two transmitting antennas of transmitting apparatus 200 (refer to FIG. 3), which is the communicating party of terminal apparatus 100, described later. For example, quality information of first transmitting antenna 210 (refer to FIG. 3) and second transmitting antenna 220 (refer to FIG. 3) is calculated using channel estimation results A, B, C and D of the four systems of FIG. 1. Quality information of first transmitting antenna 210 may be set to A+C, and quality information of second transmitting antenna 220 may be set to B+D. Furthermore, the quality estimation method described here is only one example, the present invention is not limited to the quality estimation results described here and an arbitrary quality estimation method may be used.

Comparing section 163 calculates the difference between the quality estimation results (to be more specific, a transmission rate signal of each transmitting antenna) inputted from transmission rate request generating sections 144 and 154, compares the difference between the calculated transmission rate request signal values of the antennas on the transmitting side with a threshold value and outputs the result to selecting section 165. Here, the comparison result calculated by comparing section 163 indicates whether or not to transmit the transmission rate requests corresponding to the number of antennas of the communicating party that transmits data to terminal apparatus 100.

Based on the quality estimation results (including the transmission rate request signal of each antenna) which are inputted from transmission rate request generating sections 144 and 154 and respectively correspond to the antennas of the communicating party, and information inputted from comparing section 163, selecting section 165 selects whether to input to transmission controlling section 120 the transmission rate request signals to be transmitted to the communicating party corresponding to all antennas or corresponding to one antenna. The selection result determined by selecting section 165 is outputted to transmission controlling section 120. Furthermore, when a retransmission request signal is inputted from S/P converting section 168 to transmission controlling section 120, transmission controlling section 120 transmits the retransmission request signal to the communicating party and transmits transmission rate request signals based on the selection result from selecting section 165.

P/S converting section 164 P/S converts the data obtained by compensation by interference compensating section 160 and transmitted per transmitting antenna (for example, first and second transmitting antennas 210 and 220 shown in FIG. 3) of the communicating party, and outputs the converted data to decoding section 166.

Decoding section 166 performs decoding processing on the data P/S converted by P/S converting section 164, and outputs the result to S/P converting section 168. Furthermore, when there is an error in the received signal, a retransmission request signal is extracted in S/P converting section 168 and outputted to transmission controlling section 120. Upon reception of the retransmission request signal, transmission controlling section 120 transmits the retransmission request signal to the communicating party (here, transmitting apparatus 200 shown in FIG. 3).

FIG. 3 is a block diagram showing a schematic configuration of a transmitting apparatus, which is one example of a communicating party of terminal apparatus 100, according to Embodiment 1 of the present invention shown in FIG. 2.

Transmitting apparatus 200 shown in FIG. 3 is used, for example, as a base station and transmits different data from a plurality of transmitting antennas (here, first transmitting antenna 210 and second transmitting antenna 220) to a plurality of terminal apparatuses.

Transmitting apparatus 200 has modulating and encoding sections 213 and 223, transmitting sections 215 and 225, receiving antenna 240, receiving section 243, demodulating section 245, decoding section 247, S/P converting section (indicated by "S/P" in FIG. 3) 249 and transmission controlling section 260.

Transmission controlling section 260 controls transmission of the transmission data (transmission signal). To be more specific, transmission controlling section 260 stores the transmission data and outputs the data to modulating and encoding sections 213 and 223 at a predetermined transmission time.

Further, transmission controlling section 260 controls retransmission based on retransmission information transmitted from the communicating party (here, terminal apparatus 100), controls the transmission rate based on transmission rate request signals transmitted from the communicating party and transmits transmission data using transmitting antennas based on the transmission rate request signals.

To be more specific, transmission controlling section 260 controls retransmission based on the retransmission request signal (information indicating that there is an error in the received signal) from S/P converting section 168. Then, when the transmission rate request signal transmitted from the communicating party (here, terminal apparatus 100) corresponds to only one transmitting antenna, transmission controlling section 260 controls the transmission rate so as to transmit data at the same transmission rate at all transmitting antennas 210 and 220. In this case, modulating and encoding sections 213 and 223 select the same coding rate and modulation scheme.

Modulating and encoding sections 213 and 223 perform encoding processing and modulating processing on the data to be transmitted—the data (indicated as "transmission signal" in FIG. 3) transmitted from first and second transmitting antennas 210 and 220 of transmitting apparatus 200—and output the result to transmitting sections 215 and 225. Furthermore, in modulation processing of modulating and encoding sections 213 and 223, normally the modulation scheme is set independently per transmitting antennas 210 and 220 (3GPP TR25.876), however, when the transmission rate request signal from the communicating party (here, terminal apparatus 100) corresponds to only one antenna, the same coding rate and modulation scheme are set.

Transmitting sections 215 and 225 convert the frequency of the modulated and encoded transmission data to a radio frequency band, and output the result to first and second transmitting antennas 210 and 220. First and second transmitting antennas 210 and 220 transmit the frequency converted transmission data by transmitting sections 215 and 225.

Receiving antenna 240 receives and outputs the data transmitted from the communicating party to receiving section 243, and receiving section 243 converts the frequency of the inputted received data to a baseband signal and outputs the result to demodulating section 245.

Demodulating section 245 performs demodulating processing on the inputted received data after frequency conversion and outputs the result to decoding section 247. Here, transmitting apparatus (base station) 200 identifies whether the communicating party (terminal apparatus 100) transmits the transmission rate request signal corresponding to one transmitting antenna or the transmission rate request signals corresponding to a plurality of (here, two) transmitting antennas.

For example, in the present embodiment where a MIMO communication scheme is applied to the CDMA (Code Division Multiple Access) communication scheme, demodulating section 245 compares the despreading results of the transmission rate request signals of transmitting antennas 210 and 220, and determines that only the transmission rate request signal corresponding to one transmitting antenna is transmitted when the difference of the two is large.

In this way, even if terminal apparatus 100 does not necessarily report information indicating corresponding to how many transmitting antennas the transmission rate request signals are transmitted by the communicating party (terminal apparatus 100), transmitting apparatus 200 can determine corresponding to how many transmitting antennas the transmission rate request signals are transmitted by terminal apparatus 100.

The received data, which is inputted from demodulating section 245 and configured in this way, is decoded by decoding section 247 and outputted to S/P converting section 249.

S/P converting section 249 extracts the data, retransmission information and transmission rate request information from the transmission signal transmitted from the communicating party, and inputs the result to transmission controlling section 260. That is, S/P converting section 249 sorts the received data (received signal) and the retransmission request, quality information and information indicating the data to be retransmitted that are reported by the communicating party, and outputs the result to transmission controlling section 260.

Figure 4:
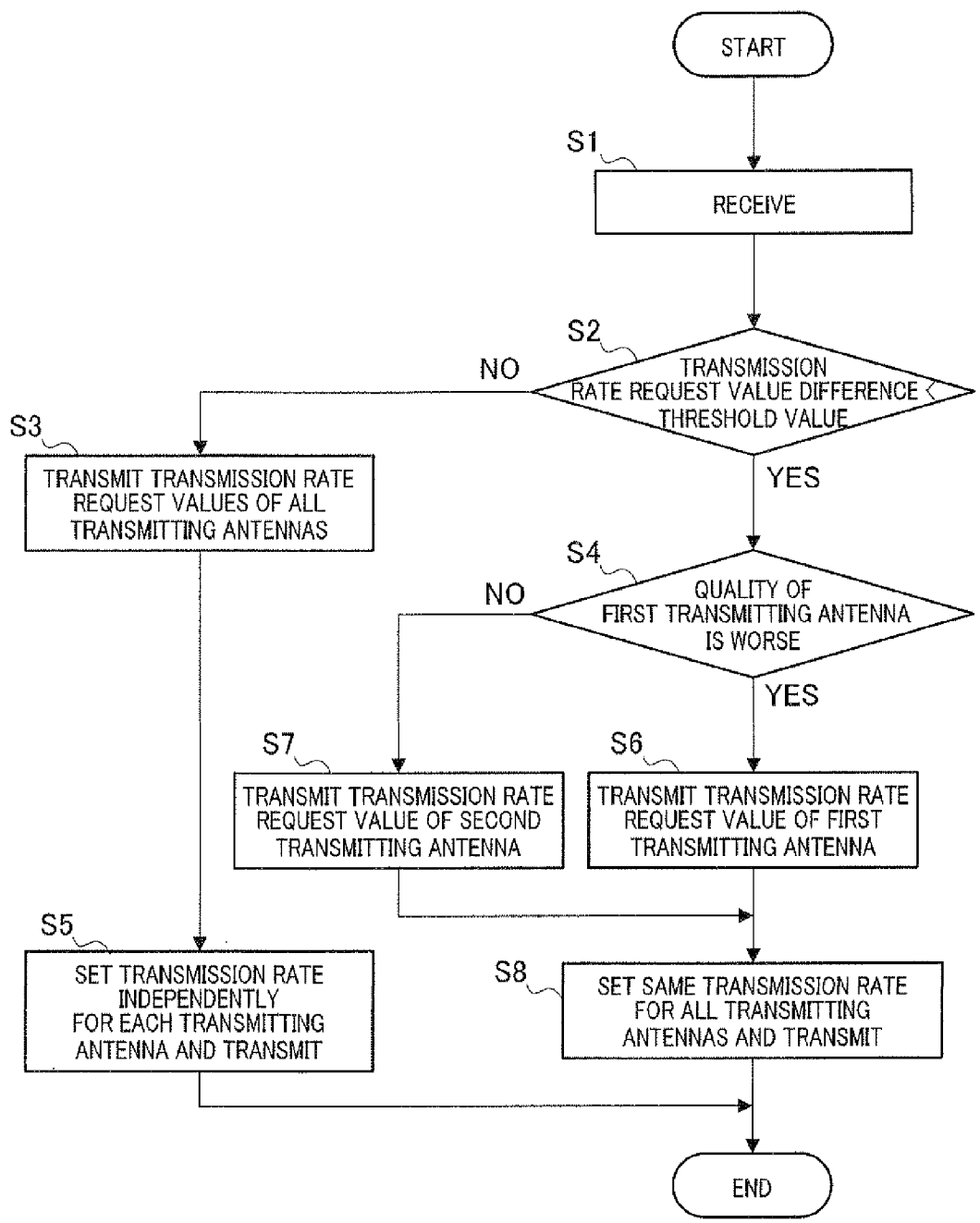
FIG. 4 is a flowchart showing a communication system having a terminal apparatus according to Embodiment 1 of the present invention.

Next, the operation of a system having terminal apparatus 100 having the above configuration, and transmitting apparatus 200 as a base station will be described using FIG. 4. FIG. 4 is a flowchart of a communication system having communication apparatus (terminal apparatus) 100 according to Embodiment 1 of the present invention.

First, in step S1, terminal apparatus 100 receives a transmission signal from transmitting apparatus (base station) 200, which is a communicating party, through receiving antennas 140 and 150, and the flow proceeds to step S2.

To be more specific, in step S1, in terminal apparatus 100, the received signals received through receiving antennas 140 and 150 are converted to baseband signals by receiving sections 142 and 152, subjected to interference compensation processing by interference compensating section 160, and become data transmitted from each transmitting antenna of the communicating party.

In terminal apparatus 100, by using the transmission data from interference compensating section 160, transmission rate request generating sections 144 and 154 perform channel quality estimation per antenna (for example, first and second transmitting antennas 210 and 220 shown in FIG. 3) of the communicating party, and generate a transmission rate request signal of each antenna.

In step S2, terminal apparatus 100 determines whether or not the generated transmission rate request signal (transmission rate request value) difference is smaller than a threshold value, the flow proceeds to step S3 when the difference is larger than or equal to the threshold value, and the flow proceeds to step S4 when the difference is smaller than the threshold value. To be more specific, in comparing section 163 of terminal apparatus 100, the difference between the transmission rate request values inputted from transmission rate request generating sections 144 and 154 is calculated, the calculated transmission rate request value difference and a threshold value are compared, and it is determined whether the calculated difference is larger or smaller than the threshold value (here, it is determined whether or not the difference is smaller than the threshold value) is determined. Based on this determination, comparing section 163 outputs to selecting section 165 information indicating whether or not to transmit the transmission rate requests corresponding to the number of antennas. The flow proceeds to step S3 when comparing section 163 outputs to selecting section 165 information indicating that the transmission rate requests corresponding to the number of antennas are transmitted, and the flow proceeds to step S4 when comparing section 163 outputs to selecting section 165 information indicating that the transmission rate requests corresponding to the number of antennas are not transmitted.

In step S3, terminal apparatus 100 transmits the transmission rate request values of all transmitting antennas of the communicating party to the communicating party (transmitting apparatus 200), and the flow proceeds to step S5. To be more specific, in step S3, comparing section 163 outputs information indicating whether or not to transmit the transmission rate requests corresponding to the number of antennas to selecting section 165, and selecting section 165 selects information indicating the transmission rate requests corresponding to the number of antennas are transmitted from this information. Then, selecting section 165 outputs the selected information and the transmission rate request values inputted from transmission rate request generating sections 144 and 154 to transmission controlling section 120. Through modulating and encoding section 125, transmitting section 132 and transmitting antenna 134, transmission controlling section 120 transmits to transmitting apparatus 200 the transmission rate request values of all antennas (here, first and second transmitting antennas 210 and 220 shown in FIG. 3) based on information from selecting section 165.

In step S4, terminal apparatus 100 compares the transmission rate request values of the antennas (for example, first and second transmitting antennas 210 and 220) of the communicating party. To be more specific, in step S4, the transmission rate request values of first transmitting antenna 210 and second transmitting antenna 220 are compared, and it is determined whether or not quality of first transmitting antenna 210 is worse. The flow proceeds to step S6 when quality of first transmitting antenna 210 is worse, and the flow proceeds to step S7 when quality of second transmitting antenna 220 is worse.

To be more specific, in step S4, information indicating that the transmission rate requests corresponding to the number of antennas are not transmitted is inputted from comparing section 163 to selecting section 165 of terminal apparatus 100. Then, selecting section 165 compares information inputted from transmission rate request generating sections 144 and 154 (transmission rate request signal values of first and second transmitting antennas 210 and 220 of the communicating party). Next, when quality of first transmitting antenna 210 is poor, selecting section 165 outputs the transmission rate request value of first transmitting antenna 210 to transmission controlling section 120, and the flow proceeds to step S6. When quality of second transmitting antenna 200 is poor, selecting section 165 outputs the transmission rate request value of second transmitting antenna 220 to transmission controlling section 120, and the flow proceeds to step S7.

In step S6, in terminal apparatus 100, transmission controlling section 120 transmits a retransmission request signal to transmitting apparatus 200, which is the communicating party, transmits the transmission rate request value of first transmitting antenna 210 of transmitting apparatus 200 based on the information from selecting section 165, and then the flow proceeds to step S8.

In step S7, in terminal apparatus 100, transmission controlling section 120 transmits to transmitting apparatus 200, which is the communicating party, the transmission rate request value of second transmitting antenna 220 of transmitting apparatus 200 based on information from selecting section 165, and the flow proceeds to step S8.

After terminal apparatus 100 performs processing of the above steps S1 to S3, S7 and S8, transmitting apparatus 200 receives through receiving antenna 240 the transmission signal including the transmission rate request value transmitted from terminal apparatus 100 through these steps. Transmitting apparatus 200 that receives the transmission signal from terminal apparatus 100 obtains the transmission rate request values through receiving section 243, demodulating section 245, decoding section 247 and S/P converting section 249, and performs processing of steps S5 and S8.

To be more specific, in step S5, upon reception of the transmission rate request values of all transmitting antennas from terminal apparatus 100, transmitting apparatus 200 (refer to FIG. 3) independently sets the transmission rate for each antenna (first and second transmitting antennas 210 and 220) and transmits data.

To be more specific, in step S5, transmission controlling section 260 of transmitting apparatus 200 sets the transmission rates of transmitting antennas 210 and 220 and controls transmission of data based on the transmission rate request obtained from the transmission signal of terminal apparatus 100 through receiving antenna 240, receiving section 243, demodulating section 245, decoding section 247 and S/P converting section 249. That is, based on the transmission rate request value from terminal apparatus 100, transmission controlling section 260 transmits the same data from first and second transmitting antennas 210 and 220 through modulating and encoding sections 213 and 223, and transmitting sections 215 and 225.

Further, in step S8, transmitting apparatus 200 sets, as the transmission rate of all transmitting antennas, the transmission rate request value from terminal apparatus 100 obtained through receiving antenna 240, receiving section 243, demodulating section 245, decoding section 247 and S/P converting section 249, and transmits the transmission data at the same transmission rate.

Thus, terminal apparatus 100 according to the present invention transmits the transmission rate request signals corresponding to all antennas of the communicating party (transmitting apparatus 200) when the difference between the transmission rate request values (CQI values) for the communicating party (transmitting apparatus 200) is larger than a threshold value. The communicating party (transmitting apparatus 200) receiving the transmission rate request signal independently sets the transmission rate per antenna (here, first and second transmitting antennas 210 and 220) and performs transmission.

On the other hand, when the difference between the transmission rate request values (CQI values) for the communicating party (transmitting apparatus 200) is smaller than a threshold value, terminal apparatus 100 transmits the transmission rate request signals corresponding to the number of antennas less than the total number of antennas of the communicating party (transmitting apparatus 200). The communicating party (transmitting apparatus 200) receiving the transmission rate request signal sets the transmission rate based on the transmission rate request signal from terminal apparatus 100 as the same transmission rate for all antennas, and transmits transmission data from all antennas.

To be more specific, when it is determined that the difference between transmission rate requests is smaller than a threshold value and quality of first transmitting antenna 210 is worse, terminal apparatus 100 transmits the transmission rate request signal of first transmitting antenna 210 to transmitting apparatus 200, which is the communicating party, and transmitting apparatus 200 sets the reported transmission rate request value of first transmitting antenna 210 as the same transmission rate for all antennas and transmits the transmission data.

Further, when it is determined that the difference between transmission rate requests is smaller than a threshold value and quality of second transmitting antenna 220 is worse, terminal apparatus 100 transmits the transmission rate request signal of second transmitting antenna 220 to transmitting apparatus 200, which is the communicating party, and transmitting apparatus 200 sets the reported transmission rate request value of second transmitting antenna 220 as the same transmission rate for all antennas and transmits the transmission data.

Furthermore, when the difference between the transmission rate request value of each transmitting antenna of the communicating party calculated by terminal apparatus 100 is smaller than a threshold value, in the above description, to prevent a decrease in the error rate, out of transmission antennas provided with the communicating party, a transmission rate request signal having the worst quality is transmitted.

Thus, according to the present embodiment, when the difference between the transmission rate request values of transmitting antennas 210 and 220 of transmitting apparatus 200 is smaller than a threshold value, the transmission rate request values transmitted from terminal apparatus 100 corresponding to all transmission antennas of transmitting apparatus 200 are not transmitted, and the transmission rate request value corresponding to only one antenna is transmitted. Upon reception of the transmission rate request value, transmitting apparatus 200 performs communication using the same transmission rate for all antennas. Thus, terminal apparatus 100 can reduce the transmission rate request signals without substantially decreasing transmission efficiency and reduce interference and power consumption. Further, transmitting apparatus 200 can reduce the amount of control information of downlink without substantially decreasing the throughput.

For example, in a communication scheme that adaptively changes the transmission rate, regardless of a MIMO communication scheme, it is necessary to transmit, to the communicating party, information indicating at which transmission rate data is transmitted.

Particularly, in a MIMO communication scheme that sets transmission rates per antenna, when information indicating at which transmission rate data is transmitted is transmitted to a transmitting apparatus, information and the amount of control signals of downlink become equivalent times of the number of antennas.

Conversely, in the present embodiment, when transmitting apparatus 200 performs communication at the same transmission rate for all transmitting antennas, only control information corresponding to one antenna needs to be transmitted from terminal apparatus 100, which is the communicating party of transmitting apparatus 200, thereby reducing the amount of control information of downlink without substantially decreasing the throughput.

Furthermore, although the case has been described in the present embodiment where the number of transmitting antennas of transmitting apparatus 200, which is the communicating party of terminal apparatus 100, is two, the number of transmitting antennas of the transmitting apparatus is not limited to this and may be arbitrarily set.

Furthermore, in contrast to the present embodiment, a method of transmitting the transmission rate request signal of the transmitting antenna having the best quality is also possible. To improve the capacity of the overall system, it is better to transmit the transmission rate request signal of the transmitting antenna having the best quality. An example of the above method will be described in Embodiment 4. Also, a method of changing the transmission rate signal to be transmitted between upon first transmission and upon retransmission is also possible (upon first transmission, the transmission rate request signal of the antenna having the best quality is transmitted, and upon retransmission, the transmission rate request signal of the antenna having the worst quality is transmitted).

Embodiment 2

Figure 5:
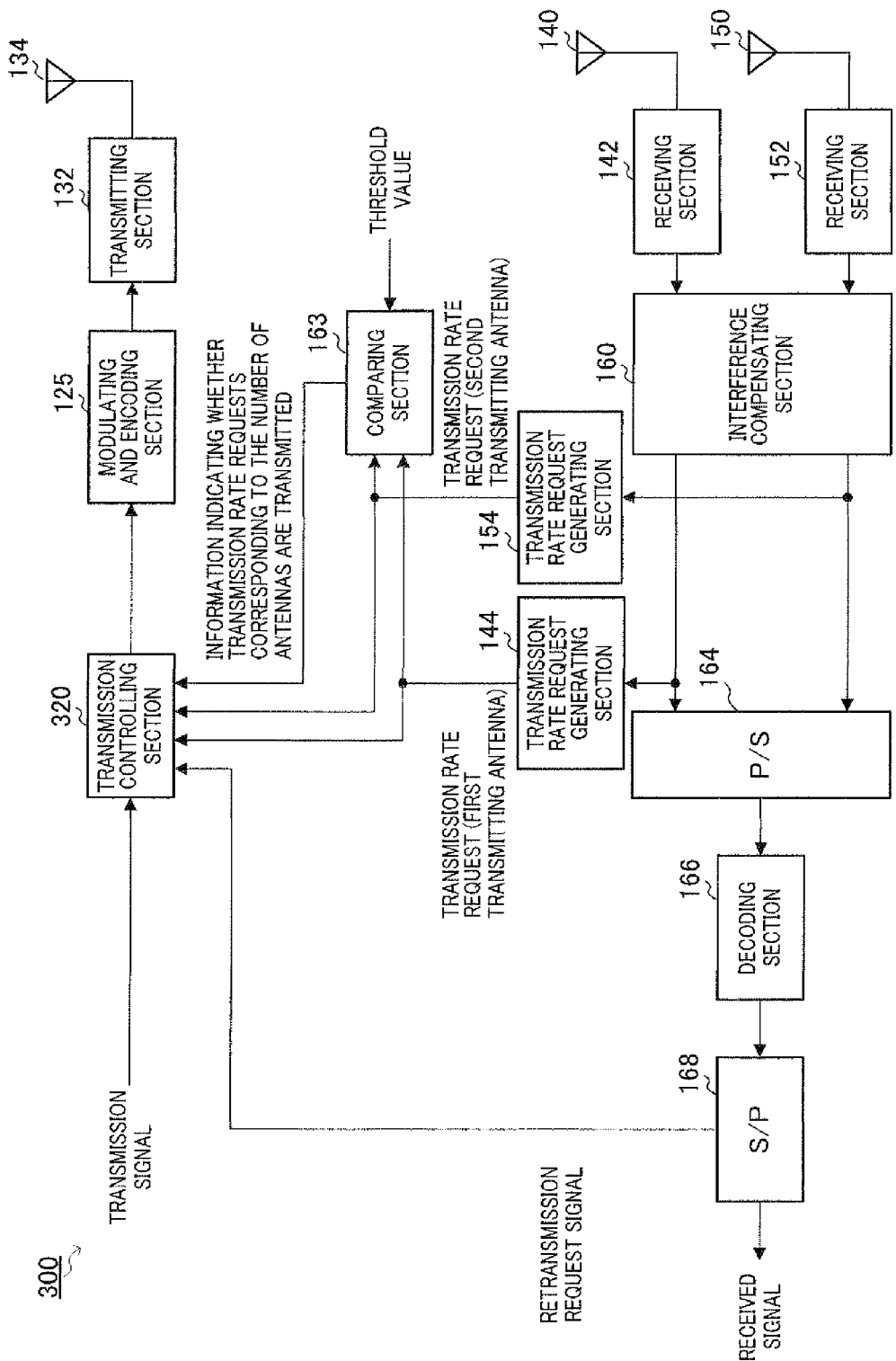
FIG. 5 is a block diagram showing a configuration of a terminal apparatus, which is a communication apparatus, according to Embodiment 2 of the present invention.

FIG. 5 is a block diagram showing the configuration of terminal apparatus 300, which is a communication apparatus, according to Embodiment 2 of the present invention.

Terminal apparatus 300 of Embodiment 2 can further reduce false detection of transmission rate request signals by the communicating party than terminal apparatus 100 of Embodiment 1 by transmitting to a communicating party information indicating whether the transmission rate request signals corresponding to the number of transmitting antennas of the communicating party are transmitted or the transmission rate request signal corresponding to only one antenna is transmitted.

First, the transmitting apparatus, such as a base station, which is a communicating party of terminal apparatus 300 of Embodiment 2 will be described.

The transmitting apparatus, which is a communicating party of terminal apparatus 300 of Embodiment 2 has the same configuration with slight difference in operation, compared to transmitting apparatus 200 of Embodiment 1 (refer to FIG. 3). Thus, only the different operation will be described, and the operations of other components will be omitted.

The operation of the transmitting apparatus, which is a communicating party of terminal apparatus 300 of Embodiment 2, differs from that of transmitting apparatus 200 of FIG. 3 in the operation of S/P converting section 249. That is, in the transmitting apparatus of Embodiment 2, when transmitting apparatus 200 of FIG. 3 is referred to, S/P converting section 249 outputs a retransmission request signal (information indicating whether or not there is an error in the received signal) to transmission controlling section 320, and, based on information which is reported by terminal apparatus 300 and indicates corresponding to how many antennas the transmission rate request signals are transmitted, extracts and outputs the transmission rate request signals to transmission controlling section 260.

Further, the transmitting apparatus of Embodiment 2, similar to transmitting apparatus 200 of Embodiment 1, is used as, a base station, or the like of a MIMO communication scheme applied to a CDMA communication scheme, and can identify whether terminal apparatus 300 transmits the transmission rate request signal corresponding to one antenna or the transmission rate request signals corresponding to a plurality of (here, two) antennas. For identification at the transmitting apparatus, a method is used of, for example, comparing the results of despreading the transmission rate request signals of transmitting antennas and determining that the transmission rate request signal corresponding to only one antenna is transmitted when the difference between the two is large.

In this way, even if terminal apparatus 300 does not necessarily report information indicating corresponding to how many transmitting antennas the transmission rate request signals are transmitted by terminal apparatus 300, the base station can determine the transmission rate request signals corresponding to how many antennas are transmitted by the terminal. However, to reduce false detection of transmission rate request signals by the transmitting apparatus, the method is effective of transmitting to the transmitting apparatus information indicating corresponding to how many antennas the transmission rate request signals are transmitted by terminal apparatus 300.

Here, information indicating corresponding to how many antennas the transmission rate request signals are transmitted by terminal apparatus 300 may be one bit if there are two antennas, for example, and is sufficiently small compared to a transmission rate request signal (for example, the transmission rate request signal in 3GPP requires 5 bits), so that the amount of uplink control information does not substantially increase.

Terminal apparatus 300 shown in FIG. 5 has the configuration that removes selecting section 165 from a configuration of terminal apparatus 100 of Embodiment 1 (refer to FIG. 2), and basically has the same configuration. Thus, in terminal apparatus 300 of the present embodiment, different components from terminal apparatus 100 (refer to FIG. 2) will be described, and other same components will be assigned the same reference numerals without further explanations.

In terminal apparatus 300 shown in FIG. 5, transmission rate request generating sections 144 and 154 output the quality estimation results respectively corresponding to the antennas of the communicating party (including the transmission rate request signal of each transmitting antenna) to comparing section 163 and transmission controlling section 320. Furthermore, the channel quality estimation method used by transmission rate request generating sections 144 and 154 is the same as described in Embodiment 1, and therefore description thereof will be omitted.

Comparing section 163 calculates the difference between the quality estimation results (to be more specific, transmission rate signals of the transmitting antennas) inputted from transmission rate request generating sections 144 and 154, compares the transmission rate request signal value of each antenna on the transmitting side with a threshold value, and outputs the result to transmission controlling section 320. Here, the comparison result calculated by comparing section 163 indicates corresponding to how many transmission antennas of the communicating party, the transmission rate request signals to be transmitted to the communicating party that transmits data to terminal apparatus 300 are transmitted.

Transmission controlling section 320 controls transmission of the transmission signal transmitted to the communicating party (for example, transmitting apparatus 200) and, similar to transmission controlling section 120, stores and outputs the transmission signal to modulating and encoding section 125 at the transmission time.

Further, transmission controlling section 320 controls transmission based on the transmission rate request signals of the transmitting antennas (for example, per first and second transmitting antennas 210 and 220) of the communicating party, which are inputted from transmission rate request generating sections 144 and 154 and information which is inputted from comparing section 163 and indicates whether or not the transmission rate requests corresponding to the number of antennas are transmitted. To be more specific, transmission controlling section 320 controls transmission of information which is inputted from comparing section 163 and indicates whether or not the transmission rate requests corresponding to the number of antennas are transmitted, and the transmission of transmission rate request signals of the transmitting antennas corresponding to this information, to the transmitting apparatus, which is the communicating party.

Thus, in Embodiment 2, terminal apparatus 300 transmits to the communicating party information indicating whether or not the transmission rate requests corresponding to the number of antennas are transmitted. As a result, it is possible to further reduce false detection of transmission rate request signals, compared to a case where terminal apparatus 100 of Embodiment 1 is used.

Furthermore, in transmitting apparatus (base station) 200 (refer to FIG. 3) receiving a signal from terminal apparatus 300, S/P converting section 249 extracts the retransmission request signal and transmission rate request signals based on information which is reported by terminal apparatus 300 and indicates corresponding to how many antennas the transmission rate request signals are transmitted, and outputs the extraction result to transmission controlling section 260 (refer to FIG. 3). The transmission rates based on this information are set for predetermined transmitting antennas, and data transmission is performed from the transmitting antennas.

Embodiment 3

Figure 6:
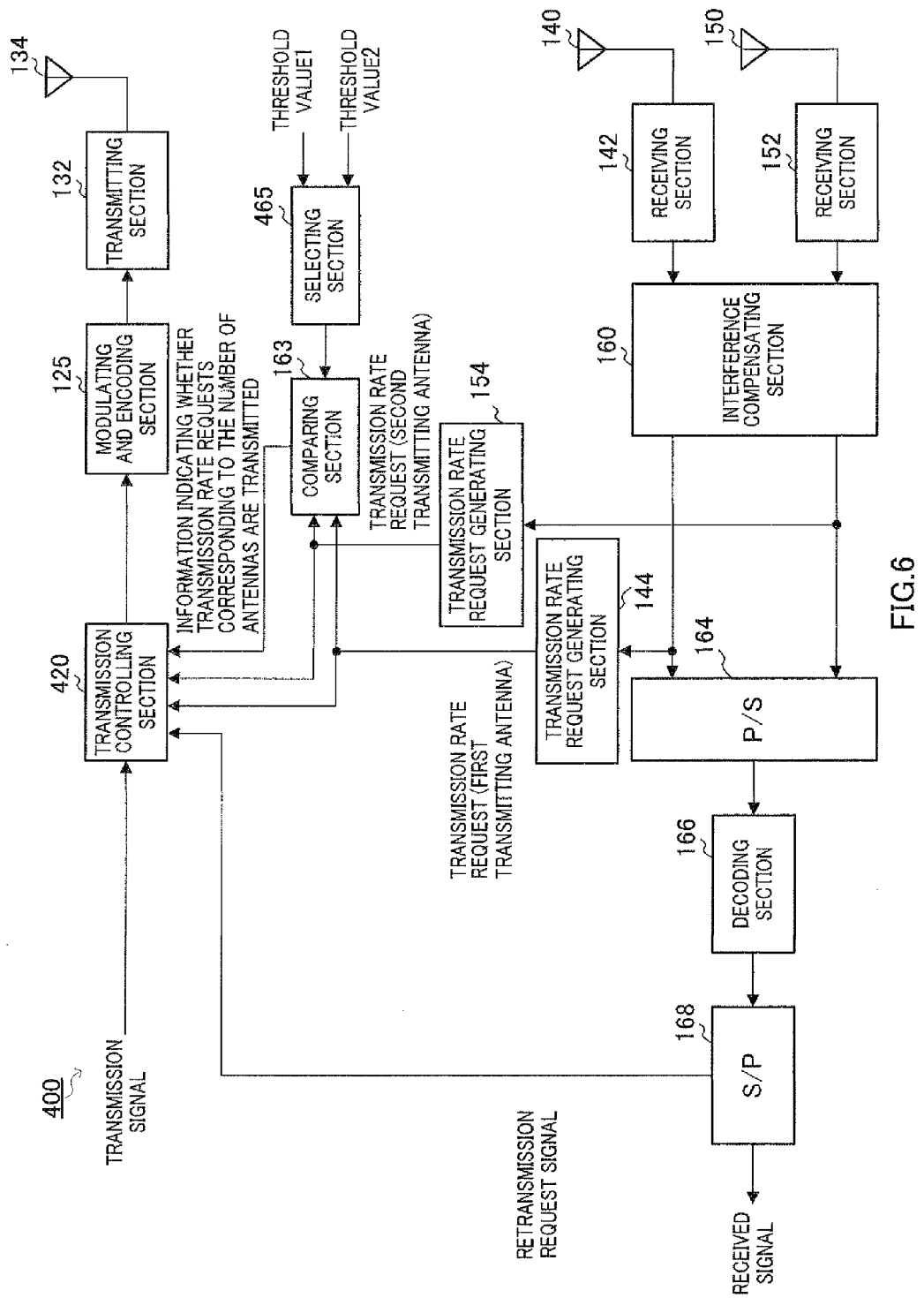
FIG. 6 is a block diagram showing a configuration of a terminal apparatus, which is a communication apparatus, according to Embodiment 3 of the present invention.

FIG. 6 is a block diagram showing the configuration of terminal apparatus 400, which is a communication apparatus, according to Embodiment 3 of the present invention.

Terminal apparatus 400 of Embodiment 3, has a variable threshold value used to select whether the transmission rate request signals corresponding to the number of transmitting antennas of the communicating party are transmitted or the transmission rate request signal corresponding to one antenna is transmitted, in comparing section 163 of transmitting apparatus 300 of Embodiment 2.

As shown in FIG. 6, terminal apparatus 400 has a configuration where the threshold value inputted to comparing section 163 of terminal apparatus 300 (refer to FIG. 5) is selected by selecting section 465. Terminal apparatus 400 has a configuration that further adds selecting section 465 in the configuration of terminal apparatus 300 corresponding to Embodiment 2 shown in FIG. 5, and other configuration is basically the same as terminal apparatus 300. Thus, the same components will be assigned the same reference numerals without further explanations.

In terminal apparatus 400, comparing section 163 receives from selecting section 465 as input a threshold value for comparing the difference between the quality estimation results (to be more specific, transmission rate signals of the transmitting antennas) inputted from transmission rate request generating sections 144 and 154, and a threshold value.

Selecting section 465 receives a predetermined number of threshold values as input. Selecting section 465 selects a predetermined threshold value from the inputted predetermined number of threshold values and outputs the selection result to comparing section 163.

In Embodiment 3, the threshold values of the selection targets in selecting section 465 are two threshold values "threshold value 1" and "threshold value 2." Furthermore, although a case of two threshold values has been described in the present embodiment, the present invention is not limited to this, and an arbitrary number of threshold values may be used. In this case as well, the comparison result calculated by comparing section 163 is outputted to transmission controlling section 420, and indicates whether or not to transmit the transmission rate requests to be transmitted to the communicating party that transmits data to terminal apparatus 400 corresponding to the number of antennas of the communicating party.

The other components of terminal apparatus 400 and advantages obtained by the other components are the same as terminal apparatus 300 of Embodiment 2, and description thereof will be omitted.

Furthermore, in selecting section 465, the optimum value of the threshold value used for selecting corresponding to how many transmission antennas the transmission rate request signals are transmitted to the transmitting apparatus of a base station, which is the communicating party, is changed according to various communication conditions. For example, in the following case, threshold values are set, and selecting section 465 selects and outputs a threshold value to comparing section 163.

1) Selecting a threshold value according to the number of users using the channel When there are a large number of users, it is necessary to reduce interference to other users, and therefore a large threshold value is set, and, preferably a transmission rate request signal corresponding to only one antenna is transmitted.

2) Selecting a threshold value according to battery power of a terminal

When there is low battery power, it is necessary to reduce power consumption, and therefore a large threshold value is set, and, preferably a transmission rate request signal corresponding to only one antenna is transmitted.

Furthermore, the threshold value selection method of terminal apparatus 400 of Embodiment 3 is only one example, the present invention is not limited to this, and each threshold value may be changed based on arbitrary conditions.

Embodiment 4

Figure 7:
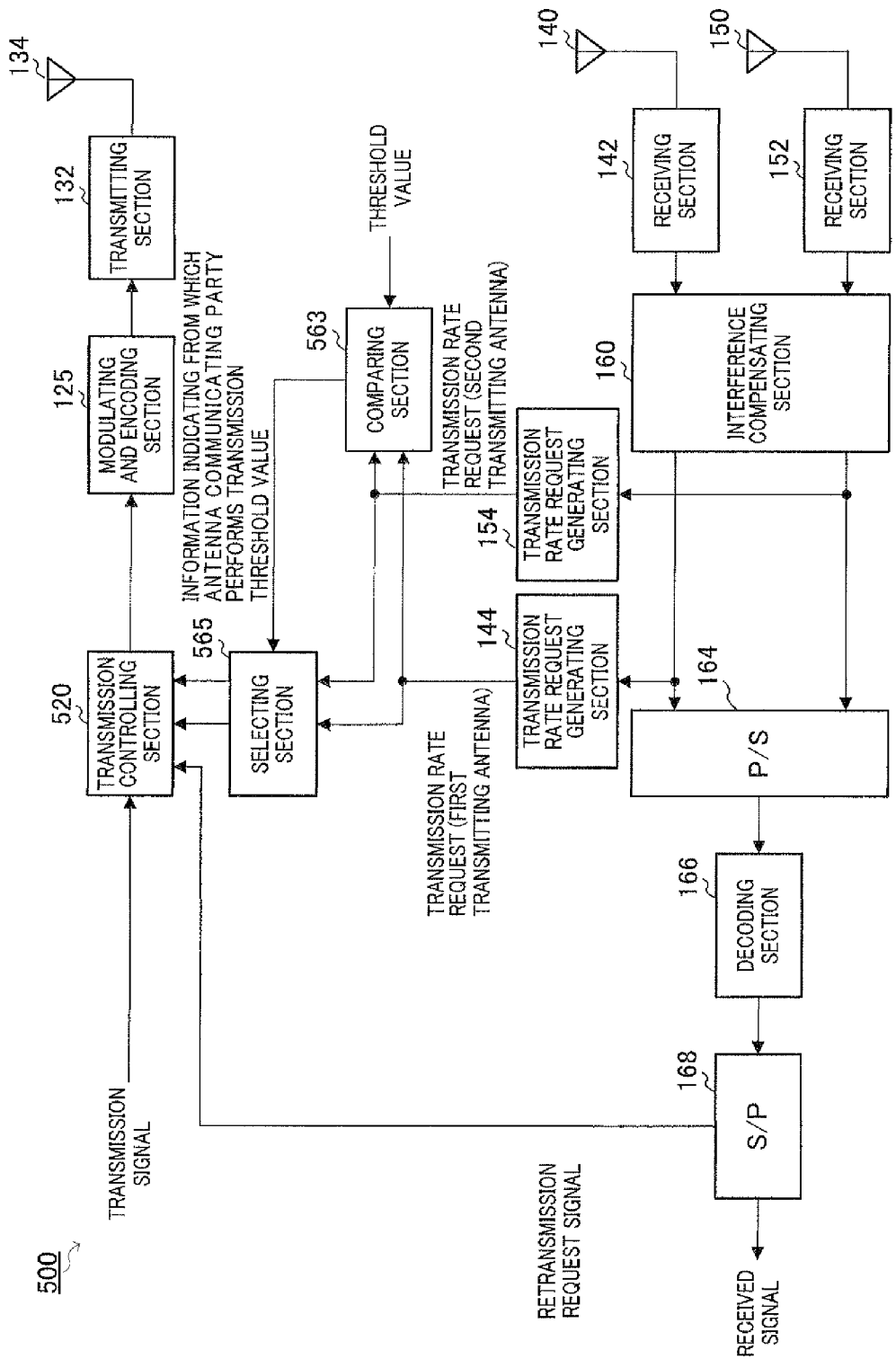
FIG. 7 is a block diagram showing a configuration of a terminal apparatus, which is a communication apparatus, according to Embodiment 4 of the present invention.

FIG. 7 is a block diagram showing the configuration of terminal apparatus 500, which is a communication apparatus, according to Embodiment 4 of the present invention.

Terminal apparatus 500 of Embodiment 4 has basically the same configuration as terminal apparatus 100 corresponding to Embodiment 1 shown in FIG. 2, and the same components will be assigned the same reference numerals without further explanation. To be more specific, in terminal apparatus 500, compared to terminal apparatus 100 (refer to FIG. 2), the advantages of transmission controlling section 520, selecting section 565 and comparing section 563 are different, and the advantages of other components are almost the same. Furthermore, the communicating party of terminal apparatus 500 has the same basic configuration as transmitting apparatus 200 (refer to FIG. 3). Thus, only the difference of the transmitting apparatus according to the present embodiment will be described, and the same configuration will be omitted.

In terminal apparatus 500 shown in FIG. 7, a transmission signal is first stored in transmission controlling section 520 and then inputted to modulating and encoding section 125 at the transmission time. Here, transmission controlling section 520 controls transmission of the transmission rate request signals and retransmission request signals based on the selection result of whether the transmission rate request signals, which are inputted from selecting section 565, are inputted to the transmission controlling section, corresponding to all antennas or corresponding to one antenna.

Next, modulating and encoding section 125 performs modulating and encoding processing on the transmission data inputted from transmission controlling section 520 and outputs the result to transmitting section 132. Transmitting section 132 converts to a radio frequency band the frequency of the transmission signal subjected to modulating and encoding processing, outputs the converted signal to transmitting antenna 134 and transmits the result to the communicating party through transmitting antenna 134.

When terminal apparatus 500 receives transmission data from the communicating party (for example, a base station having the configuration of transmitting apparatus 200 shown in FIG. 3), terminal apparatus 500 performs the following operation.

The data transmitted from the base station is received by receiving antennas 140 and 150, and converted to a baseband signal by receiving sections 142 and 152. The transmission data converted to a baseband signal is outputted to interference compensating section 160 and subjected to interference compensation by interference compensating section 160. Thus, interference compensating section 160 obtains the data transmitted per transmitting antenna of the communicating party. Then, the data outputted from interference compensating section 160 is outputted to P/S converting section 164, is subjected to P/S conversion, is outputted to transmission rate request generating sections 144 and 154 and is subjected to quality estimation per transmitting antenna of the base station, and quality estimation results including the transmission rate request signal of each transmitting antenna are calculated.

The P/S converted data in P/S converting section 164 is subjected to decoding processing by decoding section 166. In decoding section 166, when there is an error in the received signal, data including a retransmission request signal is outputted to S/P converting section 168. Furthermore, the retransmission request signal is extracted by S/P converting section 168 and inputted to transmission controlling section 520.

On the other hand, quality estimation is performed per transmitting antenna of the communicating party by transmission rate request generating sections 144 and 154, and the estimation results are outputted to selecting section 565. Further, the quality estimation results by transmission rate request generating sections 144 and 154 are outputted to comparing section 563 and compared. The comparison result calculated in comparing section 563 is outputted to selecting section 565 as information indicating from which antenna the communicating party performs transmission. Then, selecting section 565 selects, based on the input information, whether to input the transmission rate request signals to transmission controlling section 520 corresponding to all antennas or corresponding to one antenna having good quality.

Now, the configuration of the communicating party of terminal apparatus 500 of Embodiment 4 will be described.

The base station, which is the communicating party of terminal apparatus 500 of Embodiment 4, has the same configuration as transmitting apparatus 200 (refer to FIG. 3). Thus, the base station, which is the communicating party of terminal apparatus 500 of Embodiment 4, will now be described with reference to FIG. 3.

In the base station of the present embodiment, when, in the configuration shown in FIG. 3, transmission controlling section 260 receives the transmission rate request signal, which is transmitted from the terminal, corresponding to only one transmitting antenna, transmission controlling section 260 controls the transmission rates of transmitting antennas 210 and 220 so as to perform transmission using the same transmission rate. In this case, modulating and encoding sections 213 and 223 select the same coding rate and modulation scheme. Further, transmission controlling section 260 also controls retransmission when a retransmission request signal is reported by terminal apparatus 500 (refer to FIG. 7). Then, the transmission data is subjected to modulating and encoding processing by modulating and encoding sections 213 and 223.

Furthermore, although modulating and encoding sections 213 and 223 independently set the coding rate and modulation scheme per transmitting antennas 210 and 220 (3GPP TR25,876), modulating and encoding sections 213 and 223 select the same coding rate and modulation scheme when the transmission rate request signal, which is transmitted from terminal apparatus 500, corresponds to one transmitting antenna only. Then, the frequency of the encoded and modulated transmission signal is converted to a radio frequency band by transmitting sections 215 and 225, and transmitted through transmitting antennas 210 and 220. Here, when the quality (channel quality) difference between transmitting antennas 210 and 220 is large and terminal apparatus 500 transmits the transmission rate request signal corresponding to only one antenna, data is transmitted only from the transmitting antenna having good quality, and no data is transmitted from the other transmitting antenna having poor quality.

Here, when the base station performs transmission only from one antenna having good quality, methods of selecting from which antenna transmission is performed, may include, for example, using the transmission rate request signals, which are transmitted from the terminal upon previous transmission corresponding to all antennas and selecting from which antenna transmission is performed. That is, in the previous transmission rate request signals, when first transmitting antenna 210 has a larger transmission rate request value, transmission is performed from only first transmitting antenna 210, and when second transmitting antenna 220 has a larger transmission rate request value, transmission is performed from only second transmitting antenna 220. However, the selection method is not limited to this.

Figure 8:
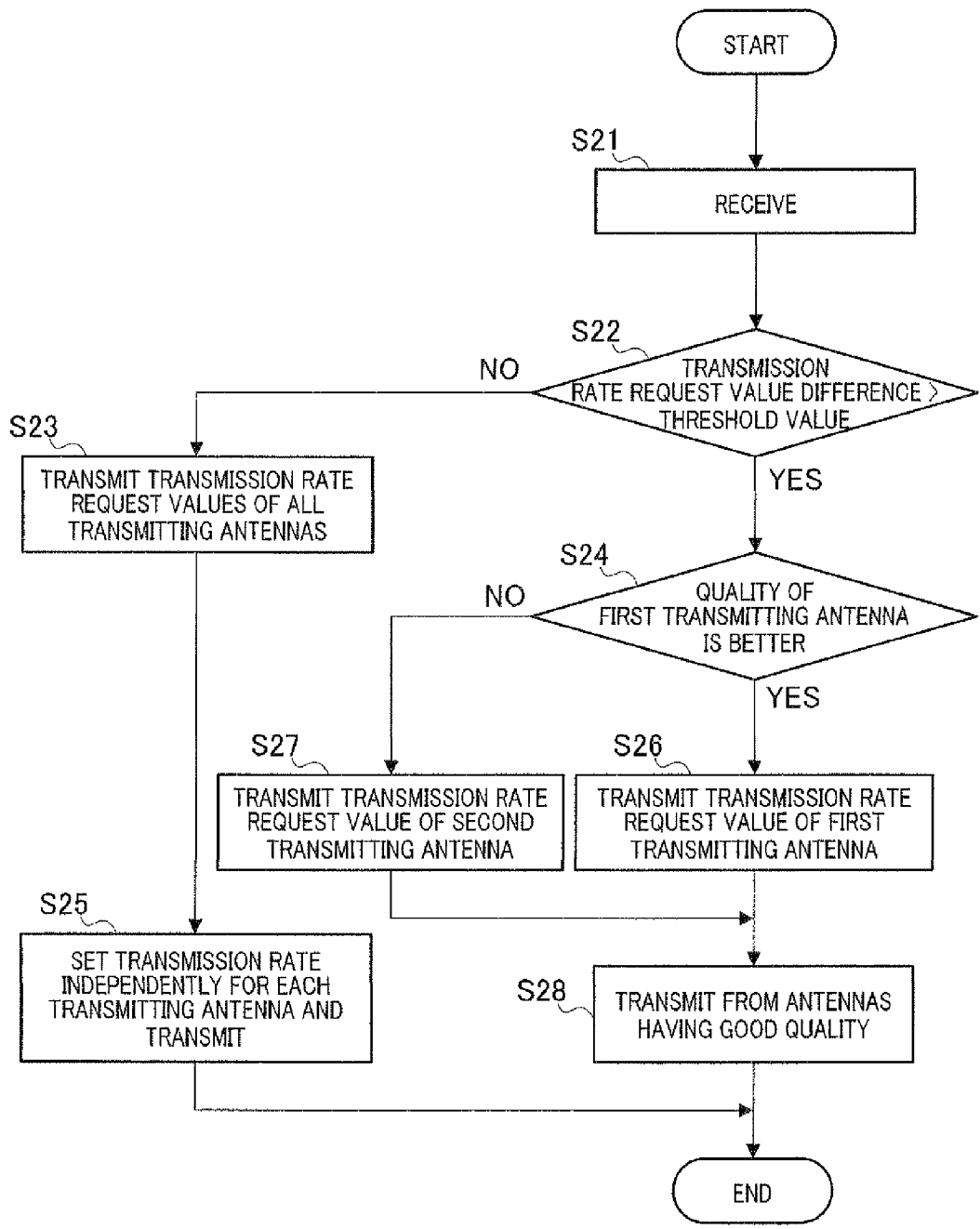
FIG. 8 is a flowchart showing a communication system having the terminal apparatus according to Embodiment 4 of the present invention.

Next, FIG. 8 illustrates operation of a system having terminal apparatus 500 will be described. FIG. 8 is a flowchart of a communication system having communication apparatus (terminal apparatus) 500 according to Embodiment 4 of the present invention.

First, in step S21, terminal apparatus 500 (refer to FIG. 7) receives transmission signals from a base station, which is a communicating party, through receiving antennas 140 and 150, and the flow proceeds to step S22.

To be more specific, in step S21, in terminal apparatus 500, the received signals received through receiving antennas 140 and 150 are converted to baseband signals by receiving sections 142 and 152, subjected to interference compensation processing by interference compensating section 160 and transmitted from the transmitting antennas of the communicating party.

In terminal apparatus 500, by using the transmission data from interference compensating section 160, transmission rate request generating sections 144 and 154 perform channel quality estimation per antenna (for example, per first and second transmitting antennas 210 and 220 shown in FIG. 3) of the communicating party, and generate a transmission rate request signal of each antenna.

In step S22, terminal apparatus 500 determines whether or not the difference of the generated transmission rate request signals (transmission rate request value) is larger than a threshold value. The flow proceeds to step S23 when the difference is equal to or smaller than the threshold value, and the flow proceeds to step S24 when the difference is larger than the threshold value.

To be more specific, comparing section 563 of terminal apparatus 500 calculates the difference between the transmission rate request values inputted from transmission rate request generating sections 144 and 154, compares the difference of the calculated transmission rate request value with a threshold value and determines whether the difference is larger or smaller than the threshold value (here, whether or not the difference is larger than the threshold value). Based on this determination, comparing section 563 outputs to selecting section 565 information indicating from which antenna the communicating party performs transmission. Comparing section 563 proceeds to step S23 or step S24 based on information outputted to selecting section 565.

In step S23, terminal apparatus 500 transmits the transmission rate request values of all transmitting antennas of the communicating party to the communicating party (for example, transmitting apparatus 200), and the flow proceeds to step S25.

To be more specific, in step S23, information inputted from comparing section 563 is transmitted from all antennas of the communicating party, and outputted to selecting section 565. Based on information indicating that the transmission rate requests corresponding to all antennas are transmitted, selecting section 565 selects all transmission rate request values inputted from transmission rate request generating sections 144 and 154, and outputs the selection result to transmission controlling section 520. Through modulating and encoding section 125, transmitting section 132 and transmitting antenna 134, transmission controlling section 520 transmits to transmitting apparatus 200 the transmission rate request values of all antennas (here, first and second transmitting antennas 210 and 220 shown in FIG. 3) based on the information from selecting section 565, and the flow proceeds to step S25.

On the other hand, in step S24, terminal apparatus 500 compares the transmission rate request values of the antenna (for example, first and second transmitting antennas 210 and 220) of the communicating party. To be more specific, in step S24, comparing section 563 compares the transmission rate request values of first transmitting antenna 210 and second transmitting antenna 220 and determines whether or not quality of first transmitting antenna 210 is better. The flow proceeds to step S26 when quality of first transmitting antenna 210 is better, and the flow proceeds to step S27 when quality of second transmitting antenna 220 is better.

To be more specific, in step S24, selecting section 565 of terminal apparatus 500 receives as input from comparing section 563 information indicating from which antenna the communicating party performs transmission, that is, information indicating an antenna having the best quality. Then, based on information from comparing section 563, selecting section 565 selects information inputted from transmission rate request generating sections 144 and 154 (the transmission rate request signal values of first and second transmitting antennas 210 and 220 of the communicating party), and outputs the selection result to transmission controlling section 520.

To be more specific, selecting section 565 outputs the transmission rate request value of first transmitting antenna 210 to transmission controlling section 520 when quality of first transmitting antenna 210 is good, and the flow proceeds to step S26. Selecting section 565 outputs the transmission rate request value of second transmitting antenna 210 to transmission controlling section 520 when quality of second transmitting antenna 220 is good, and the flow proceeds to step S27.

In step S26, in terminal apparatus 500, transmission controlling section 520 transmits to the base station, which is the communicating party (to be more specific, transmitting apparatus 200), the transmission rate request value of first transmitting antenna 210 of transmitting apparatus 200 based on information from selecting section 565, and the flow proceeds to step S28.

In step S27, in terminal apparatus 500, transmission controlling section 520 transmits to the base station which is the communicating party (here, transmitting apparatus 200), the transmission rate request value of a predetermined antenna (here, second transmitting antenna 220) of the base station (transmitting apparatus 200) based on information from selecting section 565, and the flow proceeds to step S28.

After processing of the above steps S21 to S23, S27 and S28 in terminal apparatus 500, the transmission signal that is transmitted from terminal apparatus 500 through these steps and includes the transmission rate request values is received by the base station and is subjected to processing of step S25 and step S28. When the base station has the same configuration as transmitting apparatus 200 (refer to FIG. 3), the base station (transmitting apparatus 200) receives the transmission signal from terminal apparatus 500 through receiving antenna 240. Then, through receiving section 243, demodulating section 245, decoding section 247 and S/P converting section 249, the base station obtains the transmission rate request values, and the processing of step S25 and step S28 is performed.

That is, in step S25, upon reception of the transmission rate request values of all transmitting antennas from terminal apparatus 500, the base station (transmitting apparatus 200 shown in FIG. 3) independently sets the transmission rate for the antennas (first and second transmitting antennas 210 and 220) and transmits the same data. Furthermore, processing in step S25 is the same as step S5 shown in FIG. 4, and detailed description thereof will be omitted.

Further, in step S28, the base station having the same configuration as transmitting apparatus 200 shown in FIG. 3 sets as the transmission rate of all transmitting antennas the transmission rate request value from terminal apparatus 500 obtained through receiving antenna 240, receiving section 243, demodulating section 245, decoding section 247 and S/P converting section 249, and transmits transmission data at the same transmission rate. That is, in step S28, the base station performs transmission only from the transmitting antenna having good quality corresponding to the transmission rate request value transmitted from terminal apparatus 500.

Thus, in terminal apparatus 500 according to the present invention, when the difference between the transmission rate request values (CQI values) for the communicating party (transmitting apparatus 200) is equal to or smaller than a threshold value, the transmission rate request signals of all antennas of the communicating party (transmitting apparatus 200) are transmitted. The communicating party (transmitting apparatus 200) receiving the transmission rate request signals independently sets the transmission rate per antenna (here, first and second transmitting antennas 210 and 220), and performs transmission.

On the other hand, in terminal apparatus 500, when the difference between the transmission rate request values (CQI values) for the communicating party (transmitting apparatus 200) is larger than a threshold value, the transmission rate request signals corresponding to less antennas than the total number of antennas of the communicating party (transmitting apparatus 200) are transmitted. The communicating party (transmitting apparatus 200) receiving the transmission rate request signals sets a transmission rate based on the transmission rate request signals from terminal apparatus 500 for the requested number of transmitting antennas, and transmits transmission data. Further, the communicating party sets the transmission rate corresponding to the transmitted transmission rate request value as the same transmission rate for all antennas, and transmits transmission data from all antennas.

To be more specific, in terminal apparatus 500, when it is determined that the difference between transmission rate requests is larger than a threshold value and quality of first transmitting antenna 210 is better, terminal apparatus 500 transmits the transmission rate request signal of first transmitting antenna 210 to transmitting apparatus 200, which is the communicating party. Transmitting apparatus 200 sets the reported transmission rate request value of first transmitting antenna 210 for requested first transmitting antenna 210 and transmits transmission data. Further, the communicating party sets the transmitted transmission rate request value as the same transmission rate for all antennas, and transmits transmission data from all antennas.

Further, in terminal apparatus 500, when it is determined that the difference between transmission rate requests is larger than a threshold value and quality of second transmitting antenna 220 is better, terminal apparatus 500 transmits the transmission rate request signal of second transmitting antenna 220 to transmitting apparatus 200, whish is the communicating party. Transmitting apparatus 200 sets the reported transmission rate request value of second transmitting antenna 220 for second transmitting antenna 220, and transmits transmission data. Further, the communicating party sets the transmission rate corresponding to the transmitted transmission rate request value as the same transmission rate for all antennas, and transmits transmission data from all antennas.

When the difference between the transmission rate request signals of the transmitting antennas of the communicating party (for example, transmitting apparatus 200 shown in FIG. 3) is larger than a predetermined value, terminal apparatus 500 transmits only the transmission rate request signal corresponding to one antenna, so that it is possible to reduce the amount of transmission rate request signals without substantially decreasing uplink transmission efficiency and reduce interference and power consumption.

Thus, terminal apparatus 500 has a communicating party having the same configuration as terminal apparatus 100—a plurality of transmitting antennas—, and receives transmission signals from the communicating party of a MIMO communication scheme where a transmission rate is set per transmitting antenna. When transmission rate request value of each transmission antenna receiving and extracting signals in this way is large, the transmission rate request signal corresponding to one antenna is transmitted, and the communicating party performs transmission only from an antenna having good quality. As a result, it is possible to reduce the amount of transmission rate request signals without substantially decreasing throughput.

That is, in a communication scheme that adaptively changes the transmission rate, regardless of a MIMO communication scheme, information indicating at which transmission rate transmission is performed needs to be transmitted to the communicating party.

Particularly, in a MIMO communication scheme that sets a transmission rate per antenna, when information indicating at which transmission rate transmission is performed is transmitted to the transmitting apparatus, information and the amount of control signals in downlink become equivalent times of the number of antennas. In contrast to this, in the present embodiment, when transmitting apparatus 200 performs communication using the same transmission rate at all transmitting antennas, only the control information corresponding to one antenna needs to be transmitted from terminal apparatus 500, which is the communicating party of transmitting apparatus 200, so that it is possible to reduce the amount of control information in downlink without substantially decreasing the throughput.

In general, when the difference between transmission rate request values of the transmitting antennas receiving and extracting signals from a base station is large, the data transmission amount that can be transmitted from the transmitting antenna of the communicating party having the worst quality is much less than the data transmission amount that can be transmitted from a transmitting antenna having good quality. In such a case, the throughput does not substantially improve even if the transmission rate is set independently per antenna and the transmission rate request signals corresponding to all antennas are transmitted to the base station. Conversely, by transmitting the transmission rate request signals corresponding to all transmitting antennas to the communicating party, the amount of transmission rate request signals becomes equivalent times of the number of antennas, thereby increasing interference and power consumption. For this reason, when the difference between the transmission rate request values per transmitting antenna is large, even if the transmission rate request signals corresponding to all antennas are transmitted to the base station, the advantage becomes small, and the problem becomes substantial. The present embodiment improves this problem.

Furthermore, although the case has been described in the present embodiment where the number of transmitting antennas of transmitting apparatus 200, which is the communicating party of terminal apparatus 500, is two, the present invention is not limited to this, and the number of transmitting antennas of the transmitting apparatus may be arbitrarily set.

Furthermore, in the present embodiment, when the communicating party (for example, a base station) of terminal apparatus 500 performs transmission only from one antenna having good quality, methods of selecting from which antenna transmission is performed include, for example, selecting from which antenna transmission is performed using the transmission rate request signals corresponding to all antennas transmitted from the terminal upon previous transmission. That is, in the previous transmission rate request signals, transmission is performed only from first transmitting antenna 210 when first transmitting antenna 210 has a larger transmission rate request value, and transmission is performed only from second transmitting antenna 220 when second transmitting antenna 220 has a larger transmission rate request value.

Thus, even if terminal apparatus 500 does not necessarily reports to the base station information indicating whether or not a signal indicating a transmitting antenna is transmitted, the base station can select from which antenna transmission is performed. However, in a communication system having above terminal apparatus 500 and the above transmitting apparatus, when terminal apparatus is moving fast, the channel state upon report of the previous transmission rate request values may greatly differ from the channel state upon transmission at the base station (the communicating party of terminal apparatus 500).

When a signal is transmitted from the base station under such circumstances, it is not likely to perform transmission from the transmitting antenna having the best quality, and the throughput decreases.

To prevent a decrease in the throughput under such circumstances, a method is effective of transmitting a signal including information indicating the transmitting antenna from the terminal apparatus, and selecting the transmitting antenna using the information indicating the transmitting antenna at the base station. A terminal apparatus capable of realizing such a method is described in Embodiment 5.

Embodiment 5

Figure 9:
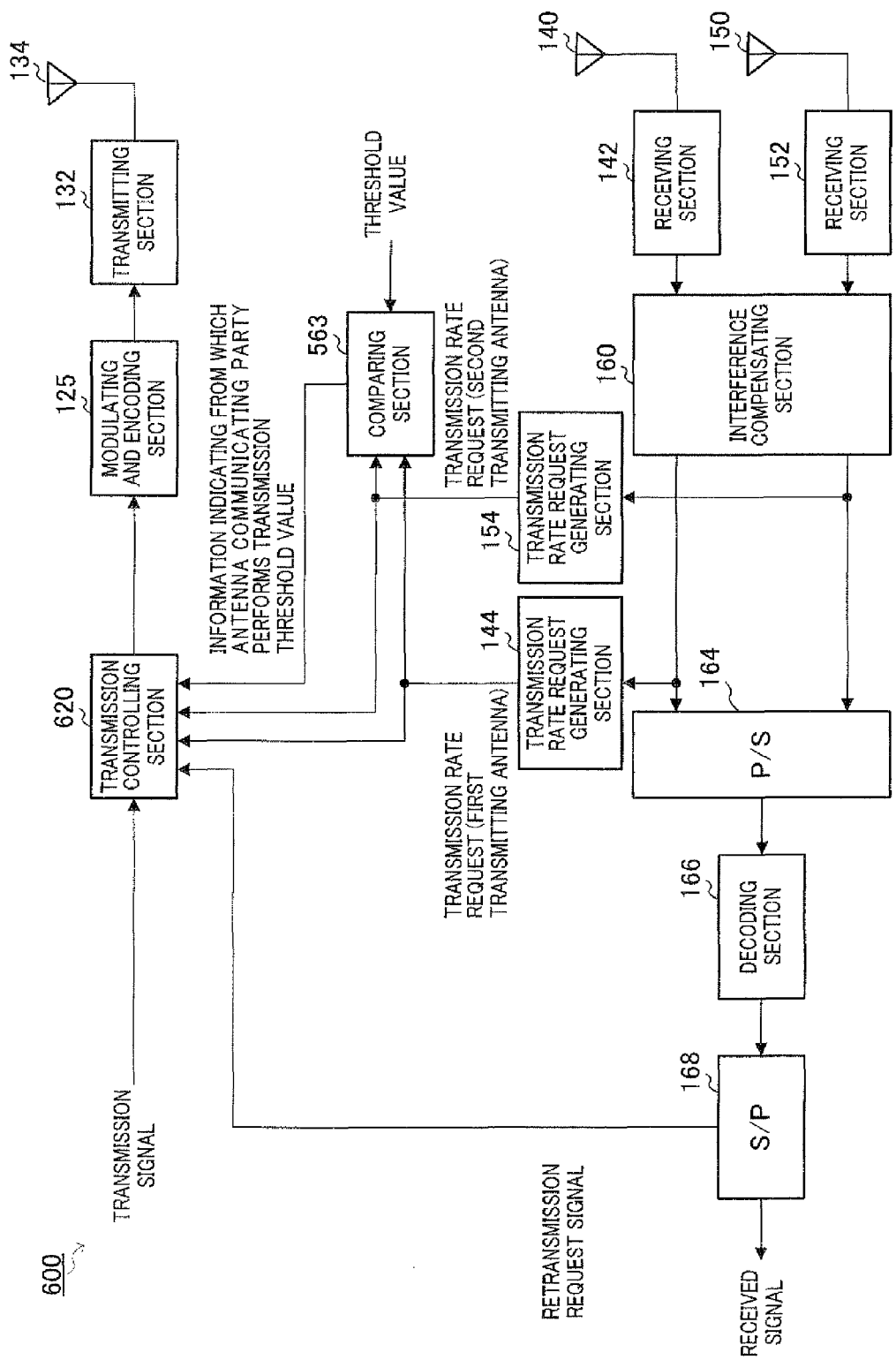
FIG. 9 is a block diagram showing a configuration of a terminal apparatus, which is a communication apparatus, according to Embodiment 5 of the present invention.

FIG. 9 is a block diagram showing the configuration of terminal apparatus 600, which is a communication apparatus, according to Embodiment 5 of the present invention.

By transmitting to the communicating party information indicating the transmitting antenna of the communicating party, terminal apparatus 600 can further prevent a decrease in the throughput particularly during high-speed movement compared to Embodiment 4.

Terminal apparatus 600 shown in FIG. 9 has a configuration that removes selecting section 565 from a configuration of terminal apparatus 500 of Embodiment 4 (refer to FIG. 7) and has basically the same configuration. Thus, in terminal apparatus 600 of the present embodiment, the different components from terminal apparatus 500 (refer to FIG. 7) will be described, and other same components are assigned the same reference numerals and will not be described.

In terminal apparatus 600 shown in FIG. 9, transmission rate request generating sections 144 and 154 output the quality estimation results respectively corresponding to the antennas of the communicating party (including the transmission rate request signal of each antenna) to comparing section 563 and transmission controlling section 620. Furthermore, the channel quality estimation method performed by transmission rate request generating sections 144 and 154 is the same as methods described in Embodiments 1 and 4, and description thereof will be omitted.

Comparing section 563 calculates the difference between the quality estimation results (to be more specific, transmission rate request signals of the transmitting antennas) inputted from transmission rate request generating sections 144 and 154, compares the difference between the transmission rate request signal values of the antennas on the transmitting side with a threshold value and outputs the result to transmission controlling section 620. Here, the comparison result calculated by comparing section 563 includes information indicating from which transmitting antenna the communicating party that transmits data to terminal apparatus 100 performs transmission.

Transmission controlling section 620 controls transmission of the transmission signal transmitted to the communicating party (transmitting apparatus 200), and, similar to transmission controlling section 120 (refer to FIG. 2), stores and outputs the transmission signal to modulating and encoding section 125 at the transmission time.

Further, based on information which is inputted from comparing section 563 and indicates from which transmitting antenna the base station, which is the communicating party, performs transmission, transmission controlling section 620 controls transmission by transmitting information indicating corresponding to how many antennas the transmission rate request signals are transmitted to the base station in addition to the transmission rate request signal.

Further, the configuration of the base station that receives a signal from terminal apparatus 600 differs only in the operation of each section of transmitting apparatus 200 shown in FIG. 3, and has basically the same configuration. Thus, the configuration of the base station of Embodiment 5 will be described with reference to FIG. 3.

In the base station (here, transmitting apparatus 200 shown in FIG. 3), which is a communicating party of terminal apparatus 600, S/P converting section 249 extracts transmission rate request signals based on information which is reported by terminal apparatus 600 and indicates corresponding to how many antennas the transmission rate request signals are transmitted, and outputs the extraction result to transmission controlling section 260.

According to terminal apparatus 600 having such a configuration, by transmitting information indicating the transmitting antenna of the base station to the base station, which is the communicating party (for example, transmitting apparatus 200 shown in FIG. 3), it is possible to set the transmitting antenna and transmission rate of the transmitting antenna and transmit data at the base station, based on the transmission rate request value having the best channel quality and information indicating corresponding to how many transmitting antennas the transmission rate request signals are transmitted to the base station.

As a result, even during high-speed movement of terminal apparatus 600 where the channel state upon report of the previous transmission rate request value substantially differs from the channel state upon transmission, the base station (the communicating party of terminal apparatus 600) side can transmit data using transmitting antennas corresponding to the number of transmitting antennas requested by terminal apparatus 600. It is thereby possible to prevent a decrease in the throughput.

Furthermore, when the number of transmitting antennas is two, information indicating from which antenna the base station performs transmission may be one bit, which is sufficiently small compared to a transmission rate request signal (for example, the transmission rate request signal in 3GPP requires 5 bits), so that the amount of control information in uplink does not substantially increase.

Further, although the case has been described in Embodiment 5 where the communicating party of terminal apparatus 600, for example, a base station that performs MIMO transmission, performs transmission only from one transmitting antenna, the present invention is not limited to this, and same information may be transmitted from a plurality of transmitting antennas. In this case, it is not necessary to report information indicating which transmitting antenna has good channel quality to the communicating party. However, it is preferable to perform transmission only from one transmitting antenna so as to reduce transmission power at the base station.

The communication apparatus according to Embodiment 1 of the present invention that transmits transmission data and transmission rate request signals corresponding to a plurality of transmitting antennas to a communicating party of a MIMO communication scheme that transmits different data from the plurality of transmitting antennas by independently setting a transmission rate per transmitting antenna employs a configuration including: a transmitting section that transmits the transmission data and the transmission rate request signals; and a controlling section that controls transmission of signals to be transmitted from the transmitting section, wherein the controlling section transmits, through the transmitting section, the transmission rate request signals corresponding to less transmitting antennas than the plurality of transmitting antennas, based on a comparison result between a difference between the transmission rate request signals of the transmitting antennas of the communicating party and a predetermined value.

According to this configuration, transmission rate request signals corresponding to less antennas than a plurality of antennas are transmitted based on a comparison result with a predetermined value to a communicating party of a MIMO communication scheme that transmits different data from the plurality of transmitting antennas by independently setting a transmission rate per transmitting antenna, so that transmission rate request signals transmitted to the communicating party do not become equivalent times of the number of transmitting antennas of the communicating party. Thus, it is possible to perform transmission by reducing transmission rate request signals without substantially decreasing transmission efficiency, so that it is possible to reduce interference to other receivers (users) and reduce power consumption upon transmission of rate request signals.

The communication apparatus according to Embodiment 2 of the present invention employs a configuration wherein the controlling section compares the difference between the transmission rate request signals of the transmitting antennas of the communicating party with the predetermined value, and, when the difference is smaller than the predetermined value, transmits the transmission rate request signals corresponding to less transmitting antennas than the plurality of transmitting antennas.

According to this configuration, it is possible to reduce transmission rate request signals without substantially decreasing transmission efficiency upon transmission of the transmission rate request signals, and reduce interference and power consumption.

The communication apparatus according to Embodiment 3 of the present invention employs a configuration wherein the controlling section compares the difference between the transmission rate request signals of the transmitting antennas of the communicating party with the predetermined value, and, when the difference is larger than the predetermined value, transmits the transmission rate request signals corresponding to less transmitting antennas than the plurality of transmitting antennas.

According to this configuration, it is possible to reduce transmission rate request signals without substantially decreasing transmission efficiency upon transmission of the transmission rate request signals, and reduce interference and power consumption.

The communication apparatus according to Embodiment 4 of the present invention employs a configuration wherein the controlling section transmits the transmission rate request signal corresponding to one transmitting antenna out of the plurality of transmitting antennas, based on a comparison result between the difference between the transmission rate request signals of the transmitting antennas of the communicating party and the predetermined value.

According to this configuration, the transmission rate request signal corresponding to one transmitting antenna out of the plurality of transmitting antennas is transmitted to a communicating party that transmits transmission rate request signals, so that it is possible at the communicating party to reduce the amount of the throughput upon reception of the transmission rate request signal compared to a case where the transmission rate request signals corresponding to all transmitting antennas are received, and reduce power consumption upon transmission of the transmission rate request signal compared to a case where the transmission rate request signals corresponding to all transmitting antennas are transmitted.

The communication apparatus according to Embodiment 5 of the present invention employs a configuration wherein the controlling section compares the difference between the transmission rate request signals of the transmitting antennas of the communicating party with the predetermined value, and, when the difference is smaller than the predetermined value, transmits only the transmission rate request signal having the smallest transmission rate request value out of the transmission rate request values at the plurality of transmitting antennas.

According to this configuration, it is possible at the communicating party to set the transmission rate of the transmitting antenna based only on the smallest transmission rate request signal of each transmitting antenna, so that it is only necessary to extract the smallest transmission rate request signal of each transmitting antenna from the transmitted signal and it is possible to prevent deterioration of the error rate upon extraction.

The communication apparatus according to Embodiment 6 of the present invention employs a configuration wherein the controlling section transmits, to the communicating party, information indicating whether the transmission rate request signals are transmitted corresponding to the number of transmitting antennas of the communicating party or corresponding to only one transmitting antenna of the communicating party.

According to this configuration, in received data, the communicating party can perform detection upon extraction of transmission rate request signals based on information indicating whether the transmission rate request signals are transmitted corresponding to the number of transmitting antennas of the communicating party or corresponding to only one transmitting antenna of the communicating party, so that it is possible to further reduce false detection of transmission rate request signals by the communicating party compared to the embodiment having the above configuration.

The communication apparatus of Embodiment 7 of the present invention employs a configuration wherein the predetermined value is variable.

According to this configuration, when transmission rate request signals are transmitted, it is possible to further reduce interference to other communication apparatuses (users) compared to a case where a communication apparatus of the above configuration is used.

The communication apparatus according to Embodiment 8 of the present invention employs a configuration wherein the controlling section transmits only the transmission rate request signal having the largest transmission rate request value when the difference between the transmission rate request signals of the transmitting antennas of the communicating party is larger than the predetermined value.

According to this configuration, the communicating party can further prevent error rate deterioration compared to a case where the communicating party receives transmission rate request signals from a communication apparatus having the above configuration.

The communication apparatus according to Embodiment 9 of the present invention employs a configuration wherein the controlling section transmits to the communicating party information indicating a transmitting antenna at which a transmission rate is set corresponding to the transmission rate request signals to be transmitted to the communicating party.

According to this configuration, based on information indicating the transmitting antenna at which a transmission rate corresponding to transmission rate request signals is set, the communicating party performs transmission after setting a transmission rate at predetermined antennas, so that it is possible to transmit data from a plurality of transmitting antennas at the transmission rate desired by the communication apparatus and further prevent a decrease in the throughput during high-speed movement compared to the communication apparatus of the above configuration.

The communication method according to Embodiment 10 of the present invention of transmitting transmission data and transmission rate request signals corresponding to a plurality of transmitting antennas to a communicating party that transmits different data from the plurality of transmitting antennas by independently setting a transmission rate per transmitting antenna includes: a transmission step of transmitting the transmission data and the transmission rate request signals; and a control step of controlling transmission of signals to be transmitted from the transmission step, wherein, the control step transmits the transmission rate request signals corresponding to less transmitting antennas than the plurality of transmitting antennas, based on a comparison result between a difference between the transmission rate request signals of the transmitting antennas of the communicating party and a predetermined value.

According to this configuration, when the transmission rate request signals are transmitted to the communicating party employing a MIMO communication scheme, it is not necessary to transmit the transmission rate request signals corresponding to all transmitting antennas of the communicating party, so that it is possible to reduce the transmission rate request signals without substantially decreasing transmission efficiency and reduce interference and power consumption.

The present application is based on Japanese Patent Application No. 2005-21681, filed on Jan. 28, 2005, the entire content of which is expressly incorporated by reference herein.

INDUSTRIAL APPLICABILITY

The communication apparatus and communication method of the present invention can reduce transmission rate request signals and perform transmission without substantially reducing transmission efficiency, have the effect of reducing interference and power consumption upon transmission of transmission rate request signals and are useful for transmitting data in a MIMO communication scheme.

The invention claimed is:

1. A communication apparatus comprising:
a receiving unit configured to receive a plurality of data transmitted from a plurality of antennas of a communicating party;
a generating section configured to generate a CQI calculated for at least one of the received plurality of data;
a modulating and encoding section configured to modulate and encode transmission data including the CQI; and
a transmitting unit configured to transmit the transmission data to the communicating party;
wherein said transmitting unit transmits, to the communicating party, information indicating a number corresponding to a number of CQIs included in the transmission data.

2. The communication apparatus according to claim 1 further comprising a control unit configured to control a transmission of the CQI in said transmitting unit, wherein said control unit control, based on a certain condition, whether the CQI is transmitted for each of the plurality of data or data, a number of which is less than a number of the plurality of data.

3. The communication apparatus according to claim 1, wherein said receiving unit receives the plurality of data, which are modulated per data in the communicating party.

4. The communication apparatus according to claim 1, wherein said control unit compare a difference between CQIs for the plurality of data with a predetermined value and control the transmission of the CQI such that the CQI is transmitted for data, a number of which is less than a number of the plurality of data when the difference is less than the predetermined value.

5. The communication apparatus according to claim 1, wherein said control unit compare a difference between CQIs for the plurality of data with a predetermined value and control the transmission of the CQI such that the CQI is transmitted for data, a number of which is less than a number of the plurality of data when the difference is greater than the predetermined value.

6. The communication apparatus according to claim 1, wherein said control unit control the transmission of the CQI based on the certain condition such that the CQI is transmitted for one of the plurality of data.

7. The communication apparatus according to claim 1, wherein said control unit compare a difference between CQIs for the plurality of data with a predetermined value and control the transmission of the CQI such that the minimum or maximum CQI is transmitted among the CQIs for the plurality of data when the difference is less than the predetermined value.

8. The communication apparatus according to claim 1, wherein said control unit compare a difference between CQIs for the plurality of data with a predetermined value and control the transmission of the CQI such that the maximum CQI is transmitted among the CQIs for the plurality of data when the difference is greater than the predetermined value.

9. A communication method comprising:
receiving a plurality of data transmitted from a plurality of antennas of a communicating party;
generating a CQI calculated for at least one of the received plurality of data;
modulating and encoding transmission data including the CQI;
transmitting the transmission data to the communicating party; and
transmitting, to the communicating party, information indicating a number corresponding to a number of CQIs included in the transmission data.

10. The communication method according to claim 9 further comprising controlling, based on a certain condition, whether the CQI is transmitted for each of the plurality of data or data, a number of which is less than a number of the plurality of data.

11. A transmitting apparatus comprising:
- a transmitting unit configured to transmit a plurality of data from a plurality of antennas to a communicating party; and
- a receiving unit configured to receive a CQI, which is calculated for at least one of the plurality of data and transmitted at the communicating party, and receive information indicating a number corresponding to a number of CQIs-included in transmission data received from the communicating party.

12. The transmitting apparatus according to claim 11, wherein said receiving unit receives the CQI, which is controlled, based on a certain condition, whether the CQI is transmitted for each of the plurality of data or data, a number of which is less than a number of the plurality of data and transmitted at the communicating party.

\* \* \* \* \*